United States Patent
Okanishi et al.

(10) Patent No.: US 8,597,851 B2
(45) Date of Patent: Dec. 3, 2013

(54) POLYMER ELECTROLYTE FUEL CELL, FUEL CELL STACK INCLUDING THE SAME, FUEL CELL SYSTEM, AND METHOD FOR OPERATING FUEL CELL SYSTEM

(75) Inventors: Takeou Okanishi, Nara (JP); Naotsugu Koashi, Kyoto (JP); Miho Gemba, Hyogo (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 13/147,114

(22) PCT Filed: Nov. 26, 2010

(86) PCT No.: PCT/JP2010/006906
§ 371 (c)(1),
(2), (4) Date: Jul. 29, 2011

(87) PCT Pub. No.: WO2011/074191
PCT Pub. Date: Jun. 23, 2011

(65) Prior Publication Data
US 2011/0281191 A1 Nov. 17, 2011

(30) Foreign Application Priority Data
Dec. 14, 2009 (JP) ................................. 2009-282555

(51) Int. Cl.
H01M 8/02 (2006.01)
H01M 8/04 (2006.01)
H01M 8/10 (2006.01)

(52) U.S. Cl.
USPC ........................................................ 429/457

(58) Field of Classification Search
USPC ........................................................ 429/457
See application file for complete search history.

(56) References Cited

U.S. PATENT DOCUMENTS

| | | | |
|---|---|---|---|
| 6,406,809 B1 * | 6/2002 | Fujii et al. | 429/434 |
| 7,261,150 B2 * | 8/2007 | Cargnelli et al. | 165/228 |
| 7,718,298 B2 * | 5/2010 | Tighe et al. | 429/513 |
| 2001/0049044 A1 * | 12/2001 | Molter | 429/34 |
| 2004/0151973 A1 * | 8/2004 | Rock | 429/38 |
| 2006/0057434 A1 * | 3/2006 | Ogushi et al. | 429/12 |
| 2010/0086819 A1 | 4/2010 | Gemba et al. | |

FOREIGN PATENT DOCUMENTS

| | | | |
|---|---|---|---|
| JP | 08-203546 | | 8/1996 |
| JP | 09-283162 | | 10/1997 |
| JP | 11233125 | A * | 8/1999 |
| JP | 2004-281304 | | 10/2004 |
| JP | 2005-235418 | | 9/2005 |
| JP | 2006-019116 | | 1/2006 |
| JP | 2006-156042 | | 6/2006 |
| JP | 2006-202570 | | 8/2006 |
| JP | 2006-331916 | | 12/2006 |
| JP | 2009176754 | A * | 8/2009 |

* cited by examiner

*Primary Examiner* — Gregg Cantelmo
(74) *Attorney, Agent, or Firm* — McDermott Will & Emery LLP

(57) ABSTRACT

A polymer electrolyte fuel cell of the present invention includes: a membrane-electrode assembly having a polymer electrolyte membrane and a pair of electrodes; a first separator having one main surface on which a first reactant gas channel is formed so as to bend; and a second separator having one main surface on which a second reactant gas channel is formed so as to bend. The first reactant gas channel is formed such that a first particular portion of the first reactant gas channel is smaller in width than each of a portion located upstream of the first particular portion and a portion located downstream of the first particular portion, the first particular portion being within a region of the electrode and including a portion where the first reactant gas channel extending from an upstream end thereof first separates from the second reactant gas channel.

23 Claims, 15 Drawing Sheets

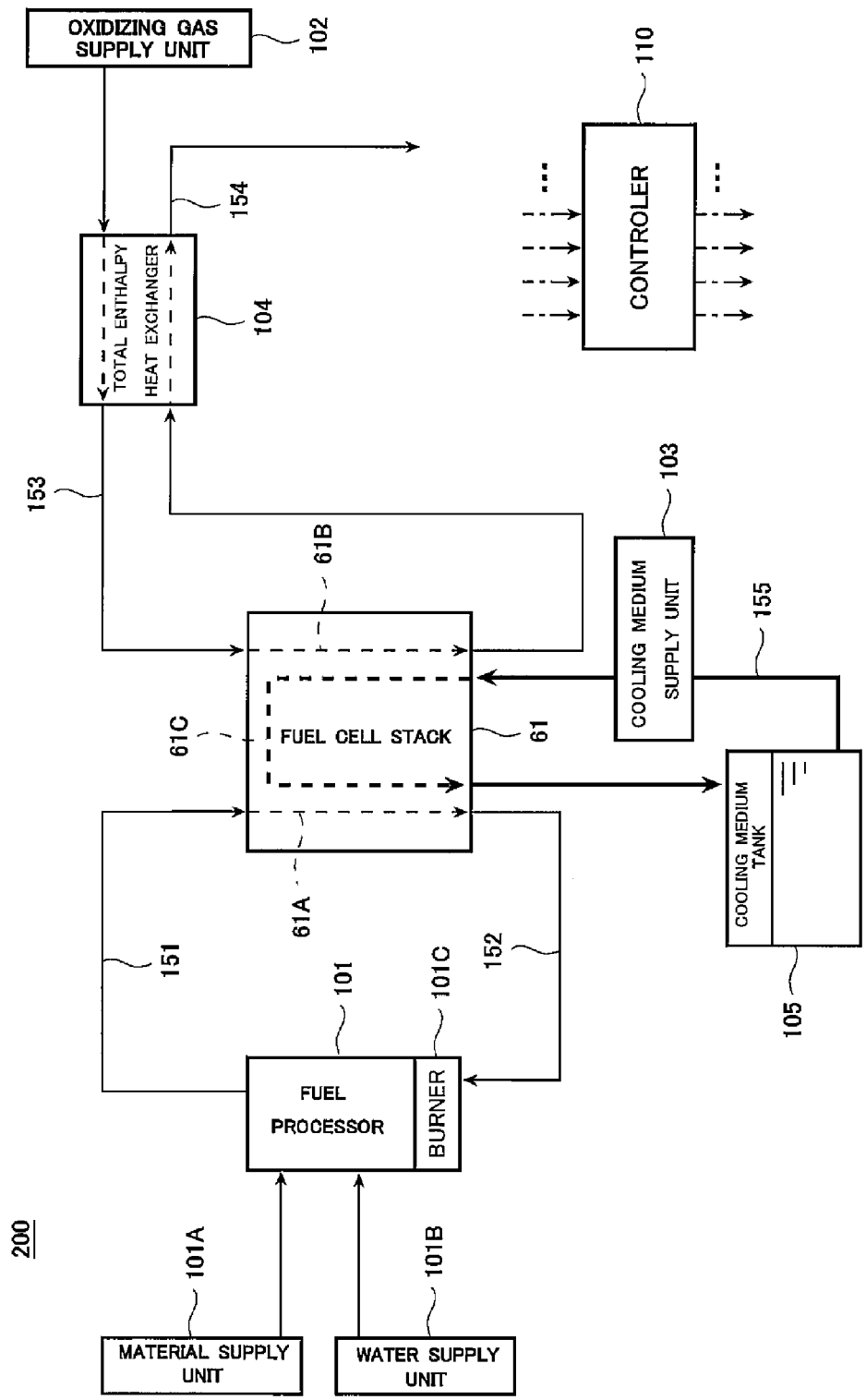

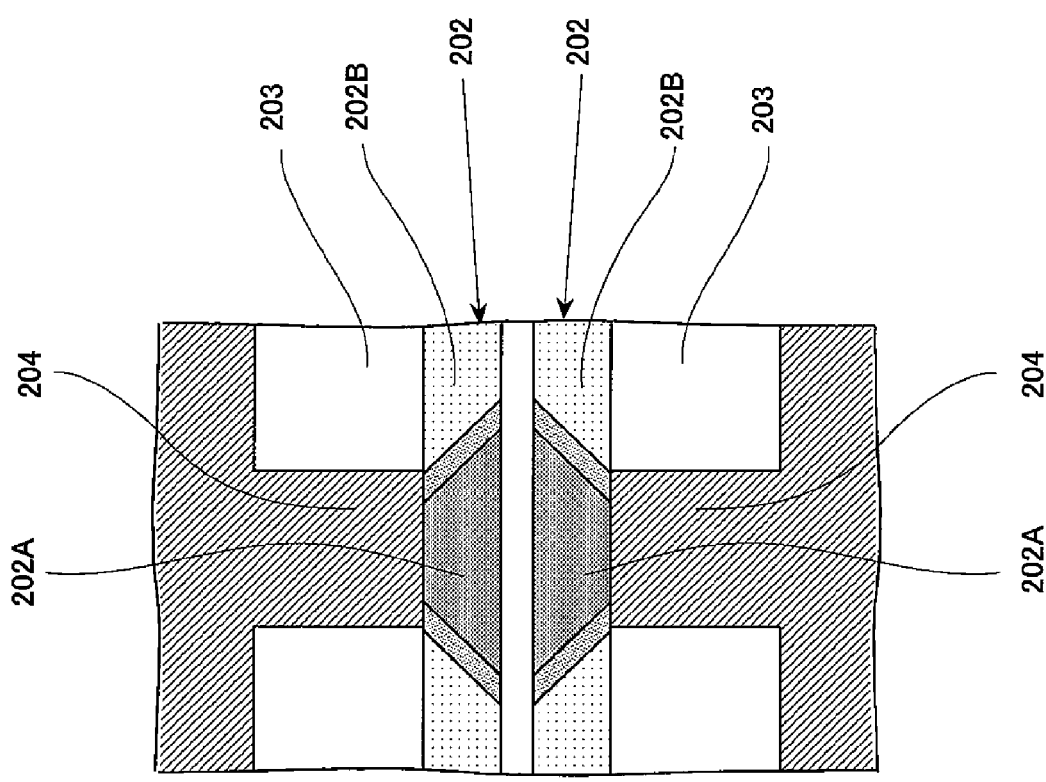

POLYMER ELECTROLYTE FUEL CELL, FUEL CELL STACK INCLUDING THE SAME, FUEL CELL SYSTEM, AND METHOD FOR OPERATING FUEL CELL SYSTEM

RELATED APPLICATIONS

This application is the U.S. National Phase under 35 U.S.C. §371 of International Application No. PCT/JP2010/006906, filed on Nov. 26, 2010, which in turn claims the benefit of Japanese Application No. 2009-282555, filed on Dec. 14, 2009, the disclosures of which Applications are incorporated by reference herein.

TECHNICAL FIELD

The present invention relates to the configuration of a polymer electrolyte fuel cell and the configuration of a fuel cell stack including the polymer electrolyte fuel cell, and particularly to the configuration of a separator of the polymer electrolyte fuel cell.

BACKGROUND ART

In recent years, a fuel cell has been attracting attention as a clean energy source. One example of the fuel cell is a polymer electrolyte fuel cell. The polymer electrolyte fuel cell (hereinafter referred to as a "PEFC") includes a membrane-electrode assembly, an anode separator, and a cathode separator. The anode separator and the cathode separator are arranged to sandwich the membrane-electrode assembly and respectively contact an anode and a cathode. The membrane-electrode assembly includes the anode and the cathode (which are called "electrodes"). Each of the anode and the cathode includes a gas diffusion layer and a catalyst layer. The gas diffusion layer includes minute holes which constitute a flow path of a reactant gas. A fuel gas channel is formed on one main surface of the anode separator. An oxidizing gas channel is formed on one main surface of the cathode separator. The fuel gas (hydrogen) having been supplied through the fuel gas channel to the anode is ionized ($H^+$), flows through the gas diffusion layer and catalyst layer of the anode, further flows through the polymer electrolyte membrane via water, and moves to the cathode side. The hydrogen ions having reached the cathode side generate water through the following electric power generating reaction in the catalyst layer of the cathode.

Anode Side: $H_2 \rightarrow 2H^+ + 2e^-$
Cathode Side: $(1/2)O_2 + 2H^+ + 2e^- \rightarrow H_2O$
Total Reaction: $H_2 + (1/2)O_2 \rightarrow H_2O$

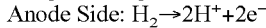
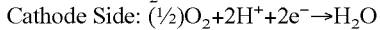

The water (generated water) generated as above flows into the oxidizing gas channel of the cathode separator as steam or liquid. Moreover, a part of the water generated in the cathode side moves to the anode side (so-called "back diffusion") to flow into the fuel gas channel. The generated water having flowed into the oxidizing gas channel or the fuel gas channel moves to a downstream side with the flow of the oxidizing gas or the fuel gas. On this account, local variations in the amount of moisture in the electrode may become large, and as a result, local variations in the amount of electric power generation may become large.

To solve such problems, a fuel cell is known, in which: first channels through which a gas flows in and second channels through which a gas is discharged are included; the first channel on the anode side and the second channel on the cathode side are opposed to each other so as to sandwich a polymer electrolyte layer; and the second channel on the anode side and the first channel on the cathode side are opposed to each other so as to sandwich the polymer electrolyte layer (see PTL 1, for example). Moreover, a polymer electrolyte fuel cell is known, in which: an anode gas passage and a cathode gas passage are opposed to each other so as to sandwich an electrolyte membrane-electrode assembly; and an anode gas and a cathode gas respectively flow through the passages in parallel (see PTL 2, for example).

The fuel cell disclosed in PTL 1 is configured such that the flow of the fuel gas and the flow of the oxidizing gas constitute so-called "opposed flow", and the channels are opposed to each other so as to sandwich the polymer electrolyte layer. With this, respective regions of the gas diffusion layers, the regions each being large in the amount of moisture, are prevented from being opposed to each other via the polymer electrolyte layer. In addition, respective regions of the gas diffusion layers, the regions each being small in the amount of moisture, are prevented from being opposed to each other via the polymer electrolyte layer. As a result, the increase in the local variations in the amount of electric power generation in the electrode can be suppressed.

Moreover, in the polymer electrolyte fuel cell disclosed in PTL 2, the humidity of the anode gas is increased to be higher than that of the cathode gas. With this, in the vicinity of an entrance of the cathode gas passage, moisture diffuses from the anode gas flowing through the vicinity of an entrance of the anode gas passage and moves from an anode electrode side to a cathode electrode side. In contrast, in the vicinity of an exit of the anode gas passage, moisture moves from the cathode electrode side to the anode electrode side. Therefore, supply and discharge control of the moisture in the entire fuel cell can be appropriately performed, and an electric power generating performance of the fuel cell can be maintained successfully.

CITATION LIST

Patent Literature

PTL 1: Japanese Laid-Open Patent Application Publication No. 2006-331916
PTL 2: Japanese Laid-Open Patent Application Publication No. 9-283162

SUMMARY OF INVENTION

Technical Problem

However, in a case where the fuel cell disclosed in each of PTLs 1 and 2 is operated in a low-humidity condition (for example, the dew point of the reactant gas is set to be lower than the temperature in the fuel cell stack), the above reaction is not adequately carried out at an upstream portion of a reactant gas channel, and therefore, the water is not generated adequately. Therefore, a portion, opposed to the upstream portion of the reactant gas channel, of the polymer electrolyte membrane dries, its ion conductivity decreases, and its power generation efficiency decreases. In this regard, there is still room for improvement.

The present invention was made to solve the above problems, and an object of the present invention is to provide a polymer electrolyte fuel cell and a fuel cell stack including the polymer electrolyte fuel cell, each of which can suppress the deterioration of the polymer electrolyte membrane especially in a case where the polymer electrolyte fuel cell is operated in the low-humidity condition.

Solution to Problem

Here, it is known that during the operation of the fuel cell, the amount of moisture (water in the form of liquid and gas)

contained in a portion, facing the reactant gas channel, of the electrode is smaller than the amount of moisture contained in a portion, contacting a rib portion formed between adjacent portions of the reactant gas channel, of the electrode. FIG. 15 is a schematic diagram showing the amount of moisture contained in the electrode during the operation of the fuel cell.

The present inventors have diligently studied to solve the problems of the above prior arts. As a result, the present inventors have found the following. To be specific, as shown in FIG. 15, the present inventors have found that: water in a portion 202A of an electrode 202 diffuses to a portion 202B of the electrode 202, the portion 202A contacting a rib portion 204 formed between adjacent portions of a reactant gas channel 203, the portion 202B facing the reactant gas channel 203; and the amount of moisture contained in a portion of the electrode 202, the portion being in the vicinity of a boundary between the rib portion 204 and the reactant gas channel 203, is larger than that in a center portion of the portion 202B of the electrode 202. In other words, the present inventors have found that the amount of moisture contained in a portion becomes smaller if the portion is far away from the portion 202A, contacting the rib portion 204, of the electrode 202. Then, the present inventors have found that adopting the following configuration is highly effective to achieve the object of the present invention. Thus, the present invention was made.

To be specific, a polymer electrolyte fuel cell according to the present invention includes: a membrane-electrode assembly including a polymer electrolyte membrane and a pair of electrodes sandwiching a portion of the polymer electrolyte membrane, the portion being located on an inner side of a peripheral portion of the polymer electrolyte membrane; an electrically-conductive first separator having a plate shape, disposed to contact one of the pair of electrodes of the membrane-electrode assembly, and formed such that a groove-like first reactant gas channel is formed on one main surface of the first separator so as to bend, said one main surface contacting said one of the pair of electrodes; and an electrically-conductive second separator having a plate shape, disposed to contact the other one of the pair of electrodes of the membrane-electrode assembly, and formed such that a groove-like second reactant gas channel is formed on one main surface of the second separator so as to bend, said one main surface contacting said other one of the pair of electrodes, wherein the first reactant gas channel is formed such that when viewed in a thickness direction of the first separator, a portion (hereinafter referred to as a "first particular portion") of the first reactant gas channel is smaller in width than each of a portion located upstream of the first particular portion of the first reactant gas channel and a portion located downstream of the first particular portion of the first reactant gas channel, the first particular portion being within a region of said one of the pair of electrodes, being located downstream of a portion where the first reactant gas channel extending from an upstream end thereof first overlaps the second reactant gas channel, and including a portion (hereinafter referred to as a "first portion") where the first reactant gas channel first separates from the second reactant gas channel.

As described above, the amount of moisture contained in a portion, facing the first reactant gas channel, of the electrode becomes smaller than the amount of moisture contained in a portion, contacting a rib portion, of the electrode. In the present invention, the first reactant gas channel is formed such that the first particular portion is smaller in width than the portion other than the first particular portion. Therefore, the portion (hereinafter referred to as a "first particular portion of the electrode"), facing the first particular portion, of the electrode is small in size, the first particular portion being small in the amount of moisture contained therein. In other words, by reducing the width of the first particular portion of the first reactant gas channel, the area of a first rib portion formed between adjacent portions of the first reactant gas channel increases, or the area of a portion (hereinafter referred to as a "first outer rib portion") between an outer end of the electrode and the first reactant gas channel when viewed in the thickness direction of the first separator increases. With this, a portion of the electrode (that is, a portion, contacting the first rib portion, of the electrode or a portion, contacting the first outer rib portion, of the electrode) can be increased in size, the portion being large in the amount of moisture contained therein. Then, especially in a case where the polymer electrolyte fuel cell according to the present invention is operated in the low-humidity condition, the water moves from the portion, being large in the amount of moisture contained therein, of the electrode to the first particular portion of the electrode. With this, the drying of the first particular portion of the electrode can be suppressed, and therefore, the drying of a portion, opposed to the first particular portion of the first reactant gas channel, of the polymer electrolyte membrane can be suppressed. Thus, in the polymer electrolyte fuel cell of the present invention, the deterioration of the polymer electrolyte membrane can be suppressed.

Moreover, in the polymer electrolyte fuel cell of the present invention, a groove-like cooling medium channel may be formed on the other main surface of the first separator and/or the other main surface of the second separator, and each of a dew point of a first reactant gas flowing through the first reactant gas channel and a dew point of a second reactant gas flowing through the second reactant gas channel may be lower than a temperature of a cooling medium flowing through the cooling medium channel.

Moreover, in the polymer electrolyte fuel cell of the present invention, the first particular portion may be constituted by a portion of the first reactant gas channel, the portion extending from the first portion and being located upstream of the first portion.

Moreover, in the polymer electrolyte fuel cell of the present invention, the first particular portion may be constituted by a portion of the first reactant gas channel, the portion extending from the first portion and being located downstream of the first portion.

Moreover, in the polymer electrolyte fuel cell of the present invention, the first particular portion may be constituted by a portion extending from the first portion and having a length corresponding to a sum of a width of the second reactant gas channel and a width of a second rib portion formed between adjacent portions of the second reactant gas channel.

Moreover, in the polymer electrolyte fuel cell of the present invention, the first particular portion may be constituted by a portion extending from the first portion and having a length corresponding to a width of the second reactant gas channel.

Moreover, in the polymer electrolyte fuel cell of the present invention, the second reactant gas channel may be one of a plurality of second reactant gas channels formed on said one main surface of the second separator, and the first particular portion may be constituted by a portion extending from the first portion and having a length corresponding to a sum of a sum of widths of the plurality of second reactant gas channels and a sum of widths of a plurality of second rib portions formed among the plurality of second reactant gas channels.

Moreover, in the polymer electrolyte fuel cell of the present invention, the second reactant gas channel may be one of a plurality of second reactant gas channels formed on said one main surface of the second separator, and the first particular portion may be constituted by a portion extending from the first portion and having a length corresponding to a sum of widths of the plurality of second reactant gas channels.

Moreover, in the polymer electrolyte fuel cell of the present invention, the second reactant gas channel may be formed such that when viewed in the thickness direction of the first separator, a portion (hereinafter referred to as a "second particular portion") of the second reactant gas channel is smaller in width than each of a portion located upstream of the second particular portion of the second reactant gas channel and a portion located downstream of the second particular portion of the second reactant gas channel, the second particular portion being within a region of said other one of the pair of electrodes, being located downstream of a portion where the second reactant gas channel extending from an upstream end thereof first overlaps the first reactant gas channel, and including a portion (hereinafter referred to as a "second portion") where the second reactant gas channel first separates from the first reactant gas channel.

As described above, the amount of moisture contained in a portion, facing the second reactant gas channel, of the electrode becomes smaller than the amount of moisture contained in a portion, contacting a rib portion, of the electrode. In the present invention, the second reactant gas channel is formed such that the second particular portion is smaller in width than the portion other than the second particular portion. Therefore, the portion (hereinafter referred to as a "second particular portion of the electrode), facing the second particular portion, of the electrode is small in size, the second particular portion being small in the amount of moisture contained therein. In other words, by reducing the width of the second particular portion of the second reactant gas channel, the area of a second rib portion formed between adjacent portions of the second reactant gas channel increases, or the area of a portion (hereinafter referred to as a "second outer rib portion") between an outer end of the electrode and the second reactant gas channel when viewed in the thickness direction of the first separator increases. With this, a portion of the electrode (that is, a portion, contacting the second rib portion, of the electrode or a portion, contacting the second outer rib portion, of the electrode) can be increased in size, the portion being large in the amount of moisture contained therein. Then, especially in a case where the polymer electrolyte fuel cell according to the present invention is operated in the low-humidity condition, the water moves from the portion, being large in the amount of moisture contained therein, of the electrode to the second particular portion of the electrode. With this, the drying of the second particular portion of the electrode can be suppressed, and therefore, the drying of a portion, opposed to the second particular portion of the second reactant gas channel, of the polymer electrolyte membrane can be suppressed. Thus, in the polymer electrolyte fuel cell of the present invention, the deterioration of the polymer electrolyte membrane can be suppressed.

Moreover, in the polymer electrolyte fuel cell of the present invention, the second particular portion may be constituted by a portion of the second reactant gas channel, the portion extending from the second portion and being located upstream of the second portion.

Moreover, in the polymer electrolyte fuel cell of the present invention, the second particular portion may be constituted by a portion of the second reactant gas channel, the portion extending from the second portion and being located downstream of the second portion.

Moreover, in the polymer electrolyte fuel cell of the present invention, the second particular portion may be constituted by a portion extending from the second portion and having a length of the width of the first reactant gas channel and a length of the width of the first rib portion formed between adjacent portions of the first reactant gas channel.

Moreover, in the polymer electrolyte fuel cell of the present invention, the second particular portion may be constituted by a portion extending from the second portion and having a length corresponding to a sum of a width of the first reactant gas channel and a width of a first rib portion formed between adjacent portions of the first reactant gas channel.

Moreover, in the polymer electrolyte fuel cell of the present invention, the second particular portion may be constituted by a portion extending from the second portion and having a length corresponding to a width of the first reactant gas channel.

Moreover, in the polymer electrolyte fuel cell of the present invention, the first reactant gas channel may be one of a plurality of first reactant gas channels formed on said one main surface of the first separator, and the second particular portion may be constituted by a portion extending from the second portion and having a length corresponding to a sum of a sum of widths of the plurality of first reactant gas channels and a sum of widths of a plurality of first rib portions formed among the plurality of first reactant gas channels.

Moreover, in the polymer electrolyte fuel cell of the present invention, the first reactant gas channel may be one of a plurality of first reactant gas channels formed on said one main surface of the first separator, and the second particular portion is constituted by a portion extending from the second portion and having a length corresponding to a sum of widths of the plurality of first reactant gas channels.

Moreover, in the polymer electrolyte fuel cell of the present invention, the first reactant gas channel and/or the second reactant gas channel may be each formed in a serpentine shape.

Moreover, in the polymer electrolyte fuel cell of the present invention, the first reactant gas channel and/or the second reactant gas channel may be each formed in a spiral shape.

Further, in the polymer electrolyte fuel cell according to the present invention, the first reactant gas channel and the second reactant gas channel may be formed so as to realize parallel flow.

Moreover, a fuel cell stack according to the present invention is configured by stacking and fastening a plurality of polymer electrolyte fuel cells.

The fuel cell stack according to the present invention includes the polymer electrolyte fuel cell according to the present invention. Therefore, especially when the fuel cell stack according to the present invention is operated in the low-humidity condition, the deterioration of the polymer electrolyte membrane can be suppressed.

Moreover, a fuel cell system according to the present invention includes: the polymer electrolyte fuel cell; a first reactant gas supply unit configured to supply the first reactant gas to the first reactant gas channel; a second reactant gas supply unit configured to supply the second reactant gas to the second reactant gas channel; a cooling medium supply unit configured to supply the cooling medium to the cooling medium channel; and a controller configured to control the first reactant gas supply unit, the second reactant gas supply unit, and the cooling medium supply unit such that each of a dew point of the first reactant gas flowing through the first reactant gas channel and a dew point of the second reactant gas flowing through the second reactant gas channel becomes lower than a temperature of the cooling medium flowing through the cooling medium channel.

Further, a fuel cell system operating method according to the present invention is a method for operating a fuel cell system including a polymer electrolyte fuel cell, the polymer electrolyte fuel cell including: a membrane-electrode assembly including a polymer electrolyte membrane and a pair of electrodes sandwiching a portion of the polymer electrolyte membrane, the portion being located on an inner side of a peripheral portion of the polymer electrolyte membrane; an electrically-conductive first separator having a plate shape, disposed to contact one of the pair of electrodes of the membrane-electrode assembly, and formed such that a groove-like first reactant gas channel is formed on one main surface of the first separator so as to bend, said one main surface contacting said one of the pair of electrodes; and an electrically-conductive second separator having a plate shape, disposed to contact the other one of the pair of electrodes of the membrane-electrode assembly, and formed such that a groove-like second reactant gas channel is formed on one main surface of the second separator so as to bend, said one main surface contacting said other one of the pair of electrodes, the first reactant gas channel being formed such that when viewed in a thickness direction of the first separator, a portion (hereinafter referred to as a "first particular portion") of the first reactant gas channel is smaller in width than each of a portion located upstream of the first particular portion of the first reactant gas channel and a portion located downstream of the first particular portion of the first reactant gas channel, the first particular portion being within a region of said one of the pair of electrodes, being located downstream of a portion where the first reactant gas channel extending from an upstream end thereof first overlaps the second reactant gas channel, and including a portion (hereinafter referred to as a "first portion") where the first reactant gas channel first separates from the second reactant gas channel, a groove-like cooling medium channel being formed on the other main surface of the first separator and/or the other main surface of the second separator, the method including the step of supplying a first reactant gas to the first reactant gas channel by a first reactant gas supply unit, supplying a second reactant gas to the second reactant gas channel by a second reactant gas supply unit, and supplying a cooling medium to the cooling medium channel by a cooling medium supply unit such that each of a dew point of the first reactant gas flowing through the first reactant gas channel and a dew point of the second reactant gas flowing through the second reactant gas channel becomes lower than a temperature of the cooling medium flowing through the cooling medium channel.

The above object, other objects, features and advantages of the present invention will be made clear by the following detailed explanation of preferred embodiments with reference to the attached drawings.

Advantageous Effects of Invention

In accordance with the polymer electrolyte fuel cell, the fuel cell stack including the polymer electrolyte fuel cell, the fuel cell system, and the method for operating the fuel cell system according to the present invention, when the fuel cell system is operated in the low-humidity condition, the drying of the polymer electrolyte membrane can be suppressed, and therefore, the deterioration of the polymer electrolyte membrane can be suppressed.

BRIEF DESCRIPTION OF DRAWINGS

FIG. 14 is a schematic diagram showing the schematic configuration of a fuel cell system according to Embodiment 5 of the present invention.

FIG. 15 is a schematic diagram showing the amount of moisture contained in an electrode during the operation of the fuel cell.

DESCRIPTION OF EMBODIMENTS

Figure 1:
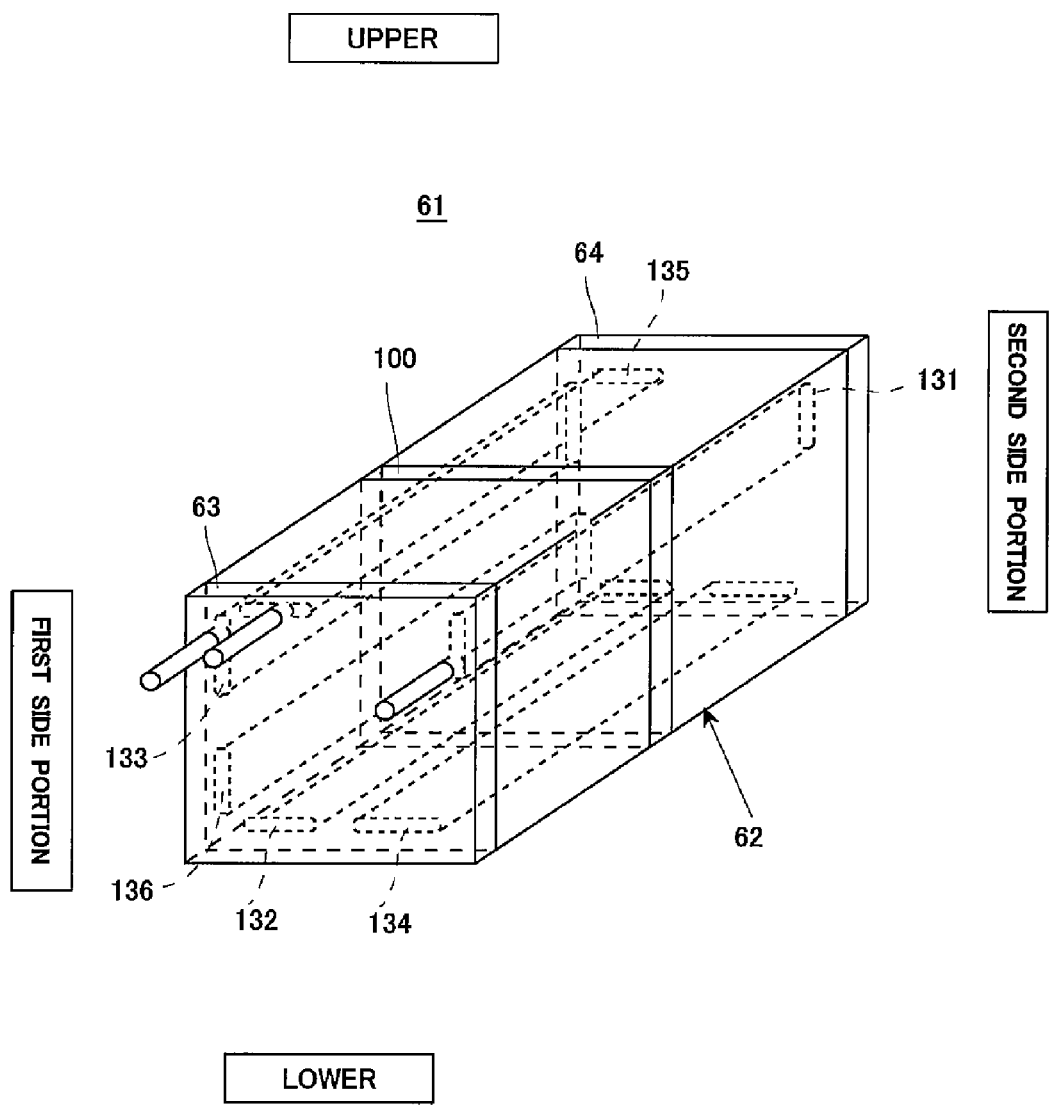
FIG. 1 is a perspective view schematically showing the schematic configuration of a fuel cell stack according to Embodiment 1 of the present invention.

Hereinafter, preferred embodiments of the present invention will be explained in reference to the drawings. In the drawings, the same reference signs are used for the same or corresponding components, and a repetition of the same explanation is avoided. In addition, in the drawings, only the components necessary to explain the present invention are shown, and the other components are omitted. Further, the present invention is not limited to the embodiments below.

Embodiment 1

Configuration of Fuel Cell Stack

FIG. 1 is a perspective view schematically showing the schematic configuration of a fuel cell stack according to Embodiment 1 of the present invention. In FIG. 1, a vertical direction of the fuel cell stack is shown as a vertical direction of the drawing.

As shown in FIG. 1, a fuel cell stack 61 according to Embodiment 1 of the present invention includes: a cell stack body 62 formed by stacking plate-shaped polymer electrolyte fuel cells (hereinafter simply referred to as "fuel cells") 100 in their thickness direction; first and second end plates 63 and 64 respectively disposed on both ends of the cell stack body 62; and fastening members, not shown, for fastening the cell stack body 62 and the first and second end plates 63 and 64 in a stack direction of the fuel cells 100. Moreover, a current collector and an insulating plate are disposed on each of the first and second end plates 63 and 64 but are not shown. The plate-shaped fuel cell 100 extends in parallel with a vertical surface, and the stack direction of the fuel cells 100 is a horizontal direction.

An oxidizing gas supply manifold 133 is formed at an upper portion of one side portion (side portion on the left side of the drawing; hereinafter referred to as a "first side portion") of the cell stack body 62 so as to penetrate in the stack direction of the fuel cells 100 of the cell stack body 62, and a cooling medium discharge manifold 136 is formed under the oxidizing gas supply manifold 133. Moreover, a cooling medium supply manifold 135 is formed on an upper inner side of the oxidizing gas supply manifold 133 of the first side portion of the cell stack body 62 so as to penetrate in the stack direction of the fuel cells 100 of the cell stack body 62. Similarly, a fuel gas discharge manifold 132 is formed on a lower inner side of the cooling medium discharge manifold 136 so as to penetrate in the stack direction of the fuel cells 100 of the cell stack body 62. Further, a fuel gas supply manifold 131 is formed at an upper portion of the other side portion (side portion on the right side of the drawing; hereinafter referred to as a "second side portion") of the cell stack body 62 so as to penetrate in the stack direction of the fuel cells 100 of the cell stack body 62, and an oxidizing gas discharge manifold 134 is formed under the fuel gas supply manifold 131 so as to penetrate in the stack direction of the fuel cells 100 of the cell stack body 62.

Then, suitable pipes are provided at respective manifolds. With this, a fuel gas, an oxidizing gas, and a cooling medium are supplied to and discharged from the fuel cell stack 61 via the suitable pipes.

Configuration of Polymer Electrolyte Fuel Cell

Next, the configuration of the polymer electrolyte fuel cell according to Embodiment 1 of the present invention will be explained in reference to FIG. 2.

Figure 2:
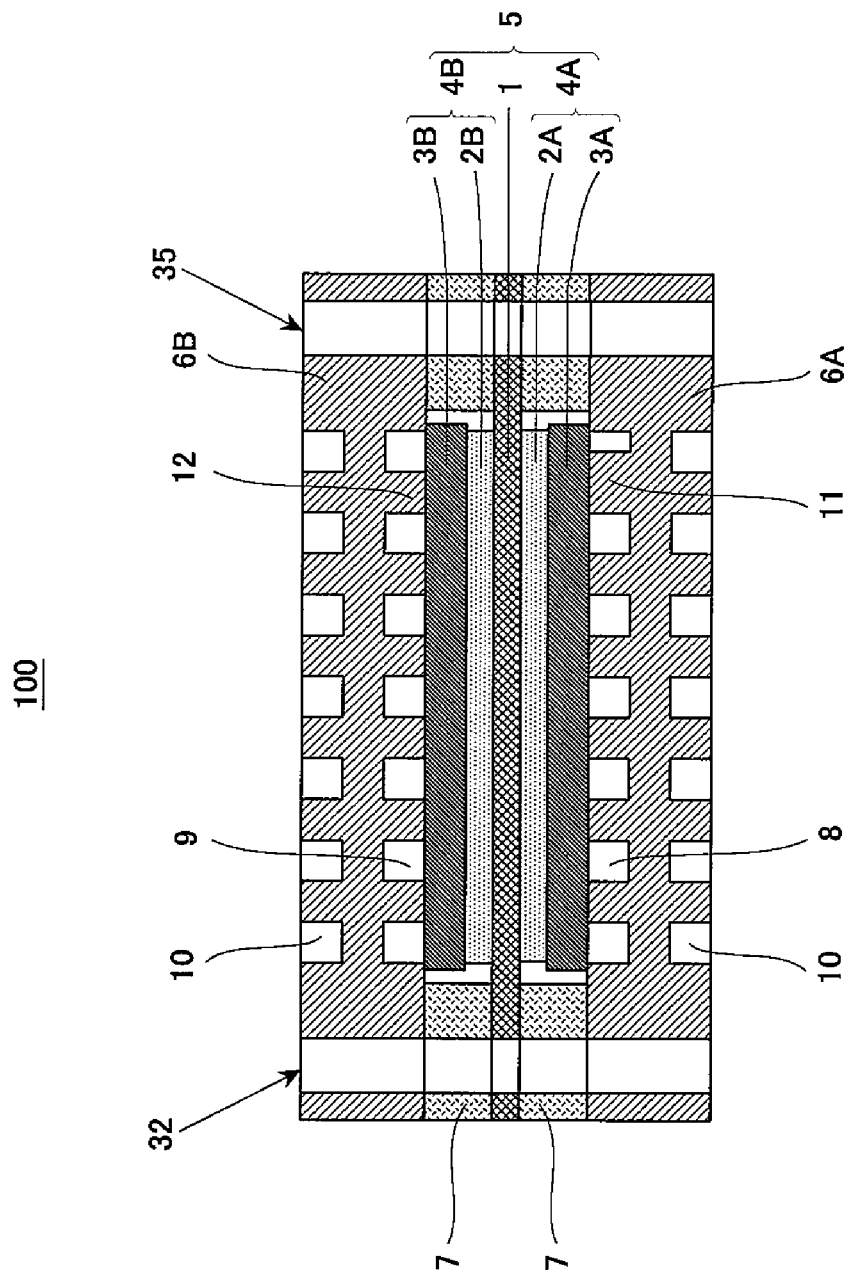
FIG. 2 is a cross-sectional view schematically showing the schematic configuration of a polymer electrolyte fuel cell of the fuel cell stack shown in FIG. 1.

FIG. 2 is a cross-sectional view schematically showing the schematic configuration of the fuel cell 100 of the fuel cell stack 61 shown in FIG. 1. In FIG. 2, a part of the fuel cell 100 is omitted.

As shown in FIG. 2, the fuel cell 100 according to Embodiment 1 includes an MEA (Membrane-Electrode-Assembly) 5, gaskets 7, an anode separator 6A, and a cathode separator 6B.

The MEA 5 includes a polymer electrolyte membrane 1 which selectively transports hydrogen ions, an anode electrode 4A, and a cathode electrode 4B. The polymer electrolyte membrane 1 has a substantially square shape (herein, a rectangular shape). The anode electrode 4A and the cathode electrode 4B are respectively disposed on both surfaces of the polymer electrolyte membrane 1 such that each of the anode electrode 4A and the cathode electrode 4B is located on an inner side of a peripheral portion of the polymer electrolyte membrane 1. Respective manifold holes (not shown), such as an oxidizing gas discharge manifold hole, are formed on the peripheral portion of the polymer electrolyte membrane 1 so as to penetrate in the thickness direction.

The anode electrode 4 includes an anode catalyst layer 2A and an anode gas diffusion layer 3A. The anode catalyst layer 2A is disposed on one main surface of the polymer electrolyte membrane 1 and contains catalyst supporting carbon and polymer electrolyte adhered to the catalyst supporting carbon. The catalyst supporting carbon is carbon powder (electrically-conductive carbon particles) supporting a platinum-based metal catalyst (electrode catalyst). The anode gas diffusion layer 3A is disposed on the anode catalyst layer 2A and has both gas permeability and electrical conductivity. Similarly, the cathode electrode 4B includes a cathode catalyst layer 2B and a cathode gas diffusion layer 3B. The cathode catalyst layer 2B is disposed on the other main surface of the polymer electrolyte membrane 1 and contains catalyst supporting carbon and polymer electrolyte adhered to the catalyst supporting carbon. The catalyst supporting carbon is carbon powder (electrically-conductive carbon particles) supporting a platinum-based metal catalyst (electrode catalyst). The cathode gas diffusion layer 3B is disposed on the cathode catalyst layer 2B and has both gas permeability and electrical conductivity.

Moreover, a pair of gaskets 7 each made of fluorocarbon rubber and having a doughnut shape are respectively disposed around the anode electrode 4A and cathode electrode 4B of the MEA 5 (to be precise, around the anode gas diffusion layer 3A and the cathode gas diffusion layer 3B) so as to sandwich the polymer electrolyte membrane 1. With this, the fuel gas and the oxidizing gas are prevented from leaking to the outside of the cell and are also prevented from being mixed with each other in the fuel cell 100. Manifold holes (not shown), such as the oxidizing gas discharge manifold hole, that are through holes extending in the thickness direction are formed on peripheral portions of the gaskets 7.

Moreover, the anode separator (first separator) 6A and the cathode separator (second separator) 6B each having the electrical conductivity are disposed to sandwich the MEA 5 and the gaskets 7. With this, the MEA 5 is mechanically fixed. In addition, when a plurality of fuel cells 100 are stacked in the thickness direction, the MEAs 5 are electrically connected to one another. As each of the separators 6A and 6B, a metal, graphite, or a combination of graphite and resin, each of which excels in thermal conductivity and electrical conductivity, can be used. For example, as each of the separators 6A and 6B, a separator produced by injection molding using a mixture of carbon powder and binder (solvent) or a separator produced by performing gold plating with respect to the surface of a titanium plate or a stainless steel plate can be used.

A groove-like fuel gas channel (first reactant gas channel) 8 through which the fuel gas flows is formed on one main surface (hereinafter referred to as an "inner surface") of the anode separator 6A, the main surface contacting the anode electrode 4A. A groove-like cooling medium channel 10 through which the cooling medium flows is formed on the other main surface (hereinafter referred to as an "outer surface") of the anode separator 6A. Similarly, a groove-like oxidizing gas channel (second reactant gas channel) 9 through which the oxidizing gas flows is formed on one main surface (hereinafter referred to as an "inner surface") of the cathode separator 6B, the main surface contacting the cathode electrode 4B. The groove-like cooling medium channel 10 through which the cooling medium flows is formed on the other main surface (hereinafter referred to as an "outer surface") of the cathode separator 6B.

With this, the fuel gas and the oxidizing gas are respectively supplied to the anode electrode 4A and the cathode electrode 4B and react with each other to generate electricity and heat. The cooling medium, such as water or an antifreezing fluid (for example, an ethylene glycol-containing liquid), is caused to flow through the cooling medium channel 10 to recover the generated heat.

The fuel cell 100 configured as above may be used as a unit cell (cell). Moreover, the fuel cells 100 may be used as the fuel cell stack 61 obtained by stacking a plurality of fuel cells 100. In the case of stacking the fuel cells 100, one cooling medium channel 10 may be formed for every two or three unit cells. Further, in a case where the cooling medium channel 10 is not formed between the unit cells, as the separator sandwiched between two MEAs 5, a separator which serves as both the anode separator 6A and the cathode separator 6B and has one main surface on which the fuel gas channel 8 is formed and the other main surface on which the oxidizing gas channel 9 is formed may be used.

Configuration of Separator

Next, the cathode separator 6B and the anode separator 6A will be explained in detail in reference to FIGS. 2 to 4.

Figure 3:
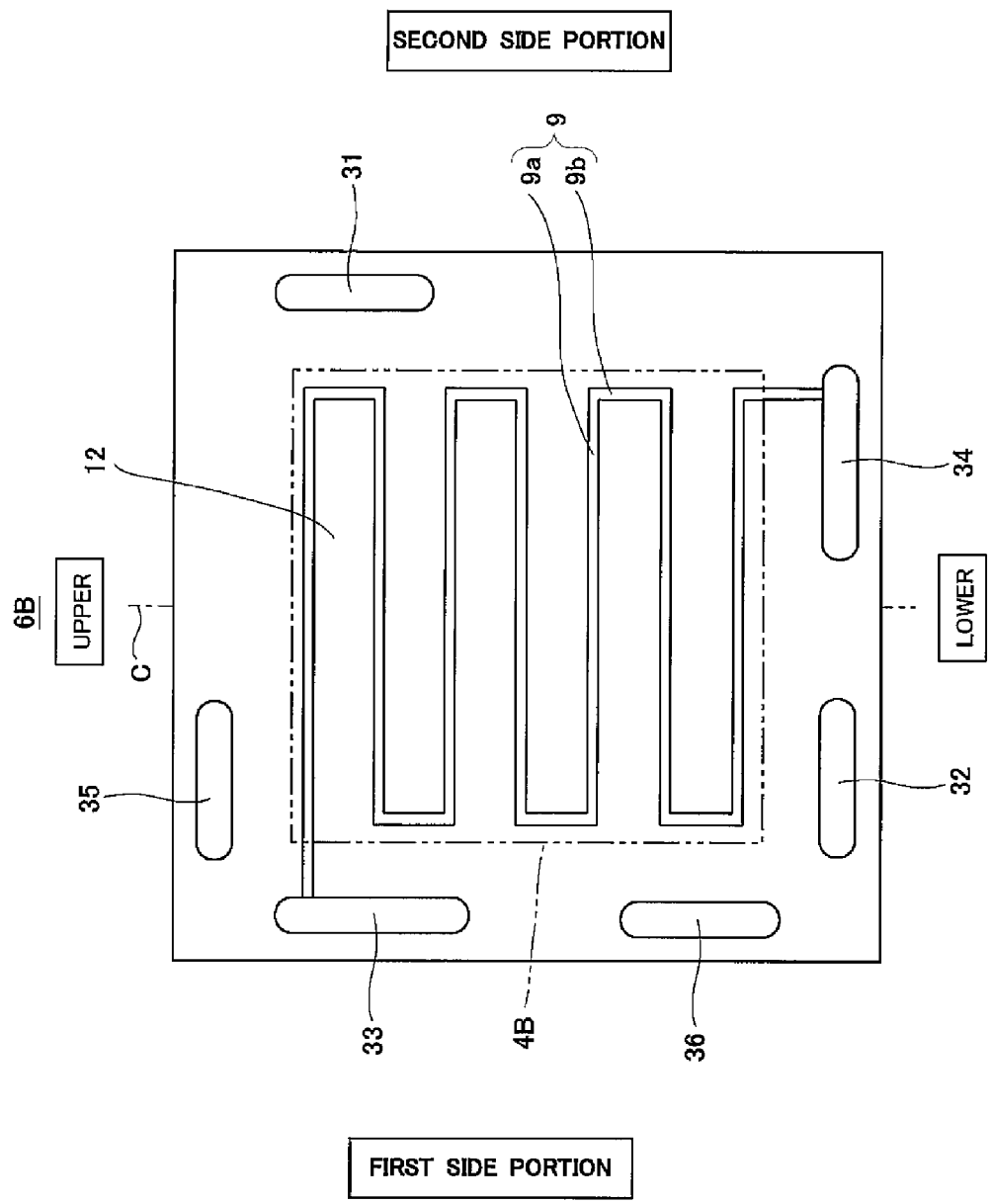
FIG. 3 is a schematic diagram showing the schematic configuration of a cathode separator of the polymer electrolyte fuel cell shown in FIG. 2.

FIG. 3 is a schematic diagram showing the schematic configuration of the cathode separator 6B of the fuel cell 100 shown in FIG. 2. FIG. 4 is a schematic diagram showing the schematic configuration of the anode separator 6A of the fuel cell 100 shown in FIG. 2. In FIGS. 3 and 4, the vertical direction of each of the cathode separator 6B and the anode separator 6A is shown as the vertical direction of the drawing. In FIG. 4, a part of the oxidizing gas channel 9 is shown by virtual lines (chain double-dashed lines).

First, the configuration of the cathode separator 6B will be explained in detail in reference to FIGS. 2 and 3.

As shown in FIG. 3, the cathode separator 6B is formed in a plate shape and a substantially square shape (herein, a rectangular shape). Manifold holes, such as a fuel gas supply manifold hole 31, are formed on a peripheral portion of the cathode separator 6B so as to penetrate in the thickness direction. Specifically, an oxidizing gas supply manifold hole (second reactant gas supply manifold hole) 33 is formed at an upper portion of one side portion (hereinafter referred to as a "first side portion") of the cathode separator 6B, and a cooling medium discharge manifold hole 36 is formed under the oxidizing gas supply manifold hole 33. Moreover, a cooling medium supply manifold hole 35 is formed on an upper inner side of the oxidizing gas supply manifold hole 33 of the first side portion. Similarly, a fuel gas discharge manifold hole 32 is formed on a lower inner side of the cooling medium discharge manifold hole 36. Further, the fuel gas supply manifold hole (first reactant gas supply manifold hole) 31 is formed at an upper portion of the other side portion (hereinafter referred to as a "second side portion") of the cathode separator 6B, and an oxidizing gas discharge manifold hole 34 is formed under the fuel gas supply manifold hole 31. The fuel gas supply manifold hole 31 and the oxidizing gas supply manifold hole 33 are opposed to each other so as to sandwich a center line.

Then, as shown in FIGS. 2 and 3, the groove-like oxidizing gas channel 9 is formed in a serpentine shape on the inner surface of the cathode separator 6B so as to connect the oxidizing gas supply manifold hole 33 and the oxidizing gas discharge manifold hole 34. Herein, the oxidizing gas channel 9 is constituted by one groove, and this groove is practically constituted by straight portions 9a and return portions 9b.

Specifically, the groove constituting the oxidizing gas channel 9 extends from the oxidizing gas supply manifold hole 33 in a horizontal direction toward the second side portion by a certain distance, extends downward therefrom by a certain distance, extends therefrom in the horizontal direction toward the first side portion by a certain distance, and extends downward therefrom by a certain distance. This pattern is repeated twice, and the groove further extends therefrom in the horizontal direction toward the second side portion by a certain distance, and extends downward therefrom to reach the oxidizing gas discharge manifold hole 34. As above, horizontally extending portions of the oxidizing gas channel 9 constitute the straight portions 9a, and downwardly extending portions of the oxidizing gas channel 9 constitute the return portions 9b. Then, as shown in FIGS. 2 and 3, a portion between the grooves (to be precise, the straight portions 9a) constituting the oxidizing gas channel 9 forms a second rib portion 12 contacting the cathode electrode 4B.

In Embodiment 1, the oxidizing gas channel 9 is formed by one groove. However, the present embodiment is not limited to this. A plurality of grooves may be formed on the inner surface of the cathode separator 6B to form a group of a plurality of oxidizing gas channels. In this case, the portion between the grooves (to be precise, the straight portions 9a) constituting each oxidizing gas channel 9 forms the second rib portion 12.

Next, the configuration of the anode separator 6A will be explained in detail in reference to FIGS. 2 to 4.

Figure 4:
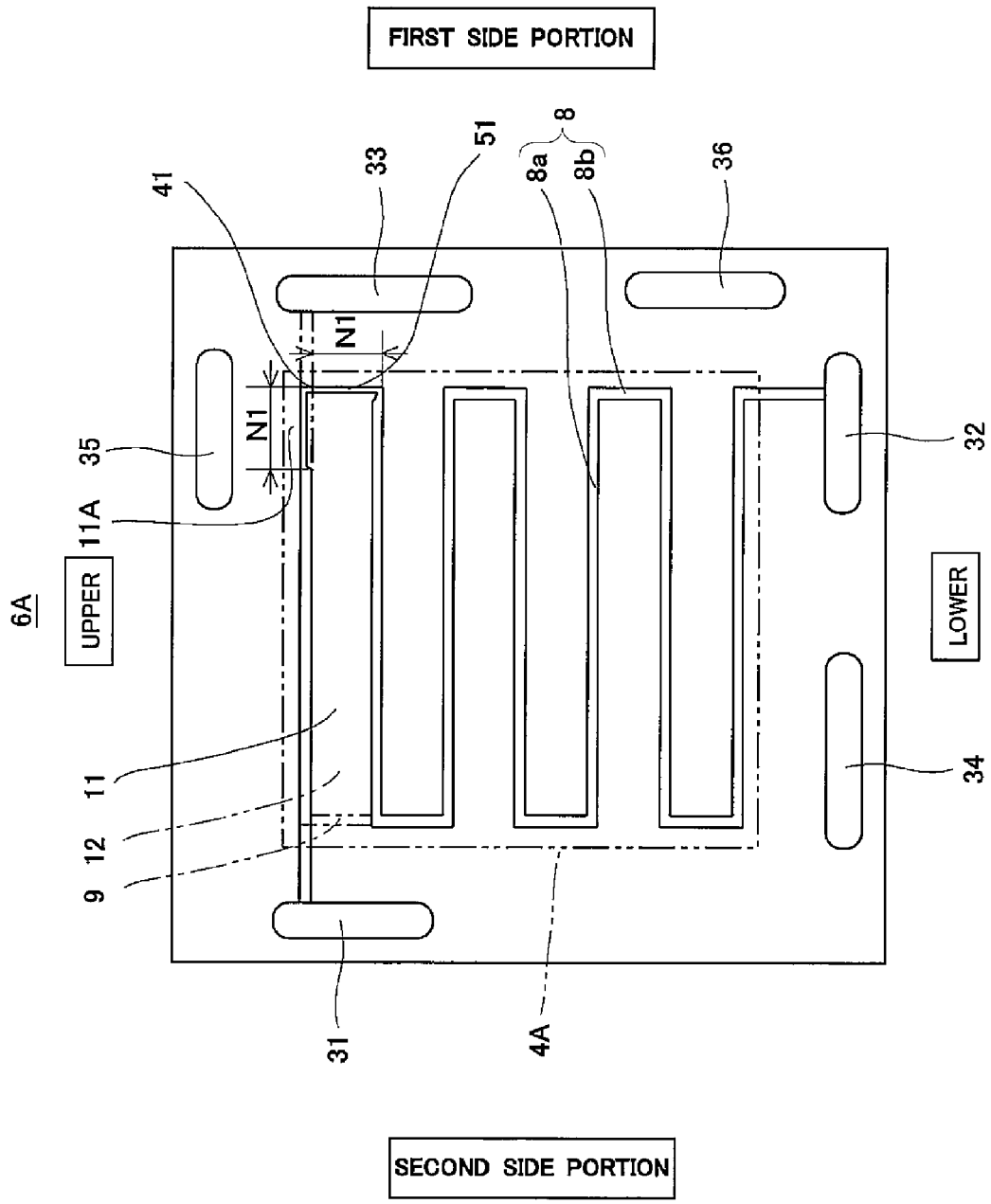
FIG. 4 is a schematic diagram showing the schematic configuration of an anode separator of the polymer electrolyte fuel cell shown in FIG. 2.

As shown in FIGS. 2 and 4, the anode separator 6A is formed in a plate shape and a substantially square shape (herein, a rectangular shape). Manifold holes, such as the fuel gas supply manifold hole 31, are formed on a peripheral portion of the anode separator 6A so as to penetrate in the thickness direction. Since the positions of the manifold holes are the same as those of the cathode separator 6B, detailed explanations thereof are omitted.

The groove-like fuel gas channel 8 is formed in a serpentine shape on the inner surface of the anode separator 6A so as to connect the fuel gas supply manifold hole 31 and the fuel gas discharge manifold hole 32. The fuel gas channel 8 and the oxidizing gas channel 9 are formed to realize so-called parallel flow. Here, the parallel flow denotes that although the fuel gas channel 8 and the oxidizing gas channel 9 partially includes portions where the oxidizing gas and the fuel gas flow in directions opposed to each other, the flow direction of the oxidizing gas from upstream to downstream and the flow direction of the fuel gas from upstream to downstream are the same as each other when viewed macroscopically (as a whole) in the thickness direction of the fuel cell 100.

Moreover, as shown in FIG. 4, the fuel gas channel 8 herein is constituted by one groove, and this groove is practically constituted by straight portions 8a and return portions 8b. Specifically, the groove constituting the fuel gas channel 8 extends from the fuel gas supply manifold hole 31 in the horizontal direction toward the first side portion by a certain distance, extends downward therefrom by a certain distance, extends therefrom in the horizontal direction toward the second side portion by a certain distance, and extends downward therefrom by a certain distance. This pattern is repeated twice, and the groove further extends therefrom in the horizontal direction toward the first side portion by a certain distance, and extends downward therefrom to reach the fuel gas discharge manifold hole 32. As above, horizontally extending portions of the fuel gas channel 8 constitute the straight portions 8a, and downwardly extending portions of the fuel gas channel 8 constitute the return portions 8b. A portion between the grooves (to be precise, the straight portions 8a) constituting the fuel gas channel 8 forms a first rib portion 11 contacting the anode 6A.

In Embodiment 1, the fuel gas channel 8 is formed by one groove. However, the present embodiment is not limited to this. A plurality of grooves may be formed on the inner surface of the anode separator 6A to form a group of a plurality of oxidizing gas channels. In this case, the portion between the grooves (to be precise, the straight portions 8a) constituting each fuel gas channel 8 forms the first rib portion 11.

Moreover, the fuel gas channel 8 includes a first portion 41. When viewed in the thickness direction of the anode separator 6A, the first portion 41 is a portion which is located in a region of the anode electrode 4A (or the cathode electrode 4B) (in a range where the anode electrode 4A (or the cathode electrode 4B) is formed) and from which the fuel gas channel 8 extending from an upstream end and overlapping the oxidizing gas channel 9 first separates. Specifically, in Embodiment 1, the first portion 41 is constituted by a downstream end of the first straight portion 8a (an upstream end of the first return portion 8b).

Further, the fuel gas channel 8 includes a first particular portion 51 including the first portion 41. In Embodiment 1, the first particular portion is constituted by a portion extending to an upstream side from the first portion 41 and a portion extending to a downstream side from the first portion 41. Specifically, an upstream end of the first particular portion 51 is a portion located upstream of the first portion 41 and away from the first portion 41 by a predetermined distance N1, and a downstream end of the first particular portion 51 is a portion located downstream of the first portion 41 and away from the first portion 41 by the predetermined distance N1.

Here, depending on the dew points of the fuel gas and the oxidizing gas (each of which is hereinafter referred to as a "reactant gas"), the temperature of the cooling medium, the widths of the fuel gas channel 8 and the oxidizing gas channel 9, and the like, the predetermined distance N1 may be equal to or shorter than a length corresponding to the sum of the width of the oxidizing gas channel 9 and the width of the second rib portion 12 or may be equal to or shorter than a length corresponding to the width of the oxidizing gas channel 9. The width of the second rib portion 12 denotes a length between the grooves (to be precise, the straight portions 9a) forming the second rib portion 12. Moreover, the width of the oxidizing gas channel 9 denotes a length in a direction perpendicular to a direction in which the oxidizing gas flows through the oxidizing gas channel 9, when viewed in the thickness direction of the anode separator 6A.

Then, the first particular portion 51 of the fuel gas channel 8 is formed so as to have a width smaller than the width of a portion of the fuel gas channel 8 other than the first particular portion 51. With this, a portion of the anode electrode 4A (hereinafter referred to as a "first particular portion of the anode electrode 4A") can be reduced in size, the portion facing the first particular portion 51 of the fuel gas channel 8. In other words, by reducing the width of the first particular portion 51 of the fuel gas channel 8, the area of the first rib portion 11 formed between the grooves (to be precise, the straight portions 8a) forming the fuel gas channel 8 can be increased.

Next, operational advantages of the fuel cell stack 61 (fuel cell 100) according to Embodiment 1 will be explained in reference to FIGS. 1 to 4.

Operational Advantages of Fuel Cell Stack (Fuel Cell)

As described above, the amount of moisture contained in the portion, facing the fuel gas channel 8, of the anode electrode 4A is smaller than the amount of moisture contained in the portion, contacting the first rib portion 11, of the anode electrode 4A. In a case where the fuel cell stack 61 is operated in a low-humidity condition (condition in which each of the dew point of the fuel gas flowing through the fuel gas channel 8 and the dew point of the oxidizing gas flowing through the oxidizing gas channel 9 is lower than the temperature of the cooling medium (herein, water) flowing through the cooling medium channel 10), the water generated by the reaction between the reactant gases is inadequate at a portion, facing an upstream portion of the fuel gas channel 8, of the anode electrode 4A when viewed in the thickness direction of the anode separator 6A, so that the amount of moisture contained in this portion of the anode electrode 4A is small. On this account, a portion, opposed to the upstream portion of the fuel gas channel 8, of the polymer electrolyte membrane 1 tends to dry, and this portion of the polymer electrolyte membrane 1 is likely to deteriorate. Here, the upstream portion of the fuel gas channel 8 denotes a portion having at least one end that is the upstream end of the fuel gas channel 8 and the other end that satisfies a formula L1≤L2, although a downstream end of the upstream portion of the fuel gas channel 8 differs depending on the width of the fuel gas channel 8, the dew points of the reactant gases, the temperature of the cooling medium, and the like. In the above formula, L1 denotes the length of the upstream portion of the fuel gas channel 8, and L2 denotes the length of the entire fuel gas channel 8.

Then, the water generated by the reaction between the reactant gases is especially inadequate at the portion, facing the first particular portion 51 of the fuel gas channel 8, of the anode electrode 4A when viewed in the thickness direction of the anode separator 6A. Therefore, the portion, opposed to the first particular portion 51 of the fuel gas channel 8, of the polymer electrolyte membrane 1 tends to especially dry, and this portion of the polymer electrolyte membrane 1 is more likely to deteriorate.

However, in the fuel cell 100 according to Embodiment 1 and the fuel cell stack 61 including the fuel cell 100, the first particular portion 51 including the first portion 41 of the fuel gas channel 8 is formed to be smaller in width than a portion of the fuel gas channel 8 other than the first particular portion 51. On this account, the portion, facing the first particular portion 51, of the anode electrode 4A (hereinafter referred to as the "first particular portion of the anode electrode 4A") when viewed in the thickness direction of the anode separator 6A can be reduced in size.

With this, the drying of the first particular portion of the anode electrode 4A can be suppressed by reducing the size of the first particular portion of the anode electrode 4A, the first particular portion of the anode electrode 4A being small in the amount of moisture contained therein. Therefore, the drying of the portion, facing the first particular portion 51 of the fuel gas channel 8 when viewed in the thickness direction of the anode separator 6A, of the polymer electrolyte membrane 1 can be suppressed.

Further, the portion, facing the first rib portion 11, of the anode electrode 4A can be increased in size by increasing the area of the first rib portion 11 formed in the vicinity of the first particular portion 51 of the fuel gas channel 8, the portion of the anode electrode 4A being large in the amount of moisture contained therein. Then, since the water moves from the portion of the anode electrode 4A, the portion facing the first rib portion 11 and being large in the amount of moisture contained therein, to the first particular portion of the anode electrode 4A, the first particular portion being small in the amount of moisture contained therein, the drying of the first particular portion of the anode electrode 4A can be suppressed, and therefore, the drying of the portion, opposed to the first particular portion 51 of the fuel gas channel 8 when viewed in the thickness direction of the anode separator 6A, of the polymer electrolyte membrane 1 can be suppressed. On this account, in the fuel cell stack 61 (fuel cell 100) according to Embodiment 1, the deterioration of the polymer electrolyte membrane 1 can be suppressed.

In Embodiment 1, the first separator is the anode separator 6A, the second separator is the cathode separator 6B, the first reactant gas channel is the fuel gas channel 8, and the second reactant gas channel is the oxidizing gas channel 9. However, the present embodiment is not limited to this. The same operational advantages as above can be obtained even in a case where the first separator is the cathode separator 6B, the second separator is the anode separator 6A, the first reactant gas channel is the oxidizing gas channel 9, and the second reactant gas channel is the fuel gas channel 8.

Moreover, in Embodiment 1, each of the fuel gas channel 8 and the oxidizing gas channel 9 is formed in a serpentine shape. However, the present embodiment is not limited to this. Only the fuel gas channel 8 may be formed in a serpentine shape, or only the oxidizing gas channel 9 may be formed in a serpentine shape.

Further, in Embodiment 1, the first rib portion 11 formed in the vicinity of the first particular portion 51 of the fuel gas channel 8 is configured to be large in area. However, the present embodiment is not limited to this. The first rib portion 11 formed in the vicinity of the first particular portion 51 of the fuel gas channel 8 may be configured to be the same in area as the other first rib portion 11, and a portion (hereinafter referred to as a "first outer rib portion 11A" (see FIG. 4)) of the inner surface of the anode separator 6A may be configured to be large in area, the portion of the inner surface of the anode separator 6A being located between an outer end of the anode electrode 4A and the first particular portion 51 of the fuel gas channel 8 when viewed in the thickness direction of the anode separator 6A. In this case, a portion, facing the first outer rib portion 11A, of the anode electrode 4A can be increased in area by increasing the area of the first outer rib portion 11A, the portion of the anode electrode 4A being large in the amount of moisture contained therein. Then, since the water moves from the portion of the anode electrode 4A, the portion facing the first outer rib portion 11A and being large in the amount of moisture contained therein, to the first particular portion of the anode electrode 4A, the first particular portion being small in the amount of moisture contained therein, the drying of the first particular portion of the anode electrode 4A can be suppressed, and therefore, the drying of the portion, facing the first particular portion 51 of the fuel gas channel 8 when viewed in the thickness direction of the anode separator 6A, of the polymer electrolyte membrane 1 can be suppressed.

Modification Example 1

Next, Modification Example of the fuel cell stack 61 (fuel cell 100) according to Embodiment 1 will be explained.

Figure 5:
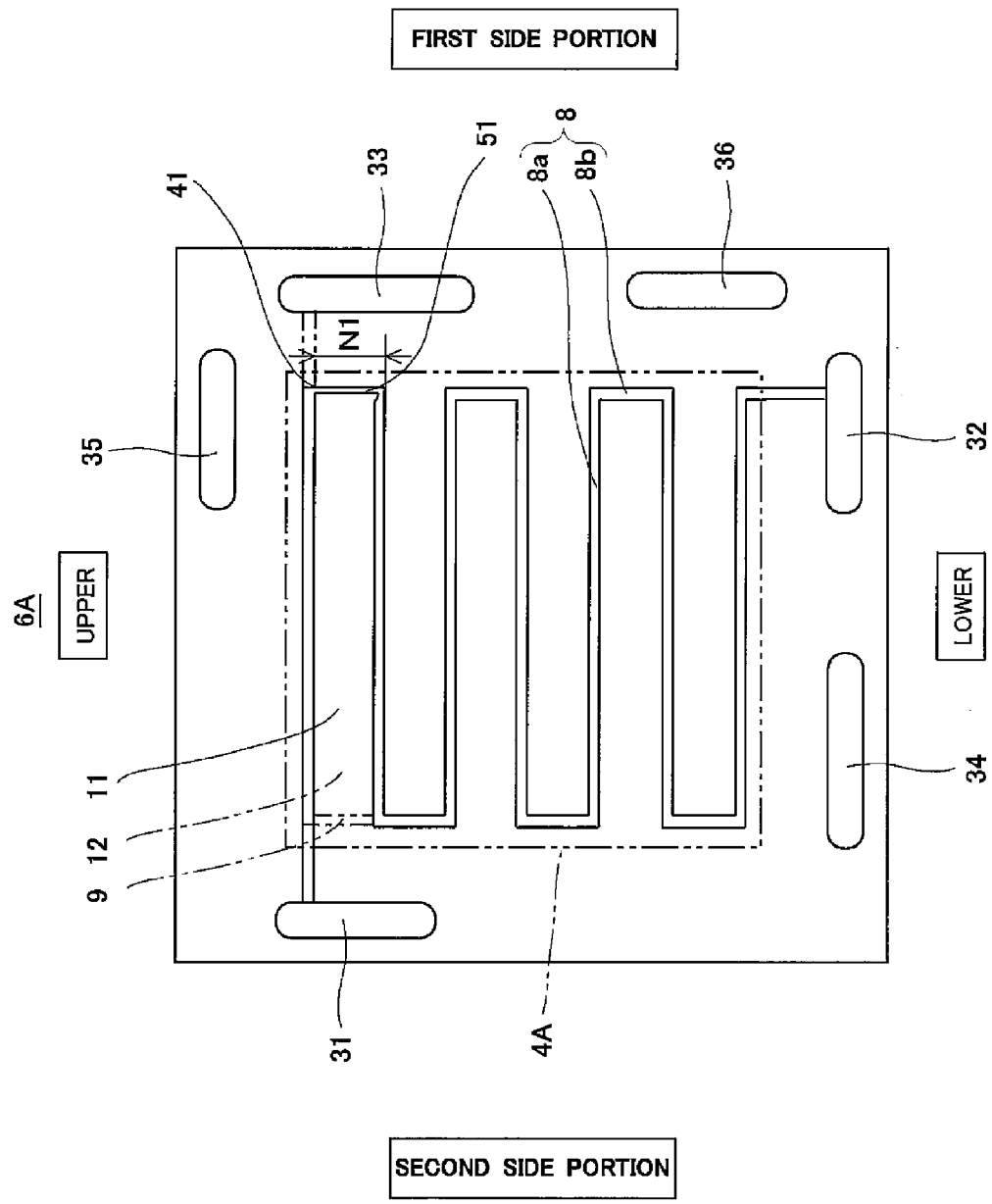
FIG. 5 is a schematic diagram showing the schematic configuration of the anode separator of a fuel cell of the fuel cell stack of Modification Example 1.

FIG. 5 is a schematic diagram showing the schematic configuration of the anode separator of the fuel cell of the fuel cell stack of Modification Example 1. In FIG. 5, the vertical direction of the anode separator is shown as the vertical direction of the drawing. Moreover, in FIG. 5, a part of the oxidizing gas channel is shown by virtual lines (chain double-dashed lines).

As shown in FIG. 5, the fuel cell stack 61 of Modification Example 1 is the same in basic configuration as the fuel cell stack 61 according to Embodiment 1, but the configuration of the first particular portion 51 is different. Specifically, the first particular portion 51 of Modification Example 1 is constituted by a portion extending to the downstream side from the first portion 41 by a predetermined distance N. To be specific, the upstream end of the first particular portion 51 is the first portion 41, and the downstream end of the first particular portion 51 is a portion located downstream of the first portion 41 and away from the first portion 41 by the predetermined distance N1.

Here, depending on the dew points of the fuel gas and the oxidizing gas (each of which is hereinafter referred to as the "reactant gas"), the temperature of the cooling medium, the widths of the fuel gas channel 8 and the oxidizing gas channel 9, and the like, the predetermined distance N1 may be equal to or shorter than the sum of the width of the oxidizing gas channel 9 and the width of the second rib portion 12 or may be equal to or shorter than the width of the oxidizing gas channel 9. The width of the second rib portion 12 denotes a length between the grooves (to be precise, the straight portions 9a) forming the second rib portion 12.

Even the fuel cell stack 61 (fuel cell 100) of Modification Example 1 configured as above can obtain the same operational advantages as the fuel cell stack 61 (fuel cell 100) of Embodiment 1.

Modification Example 2

Figure 6:
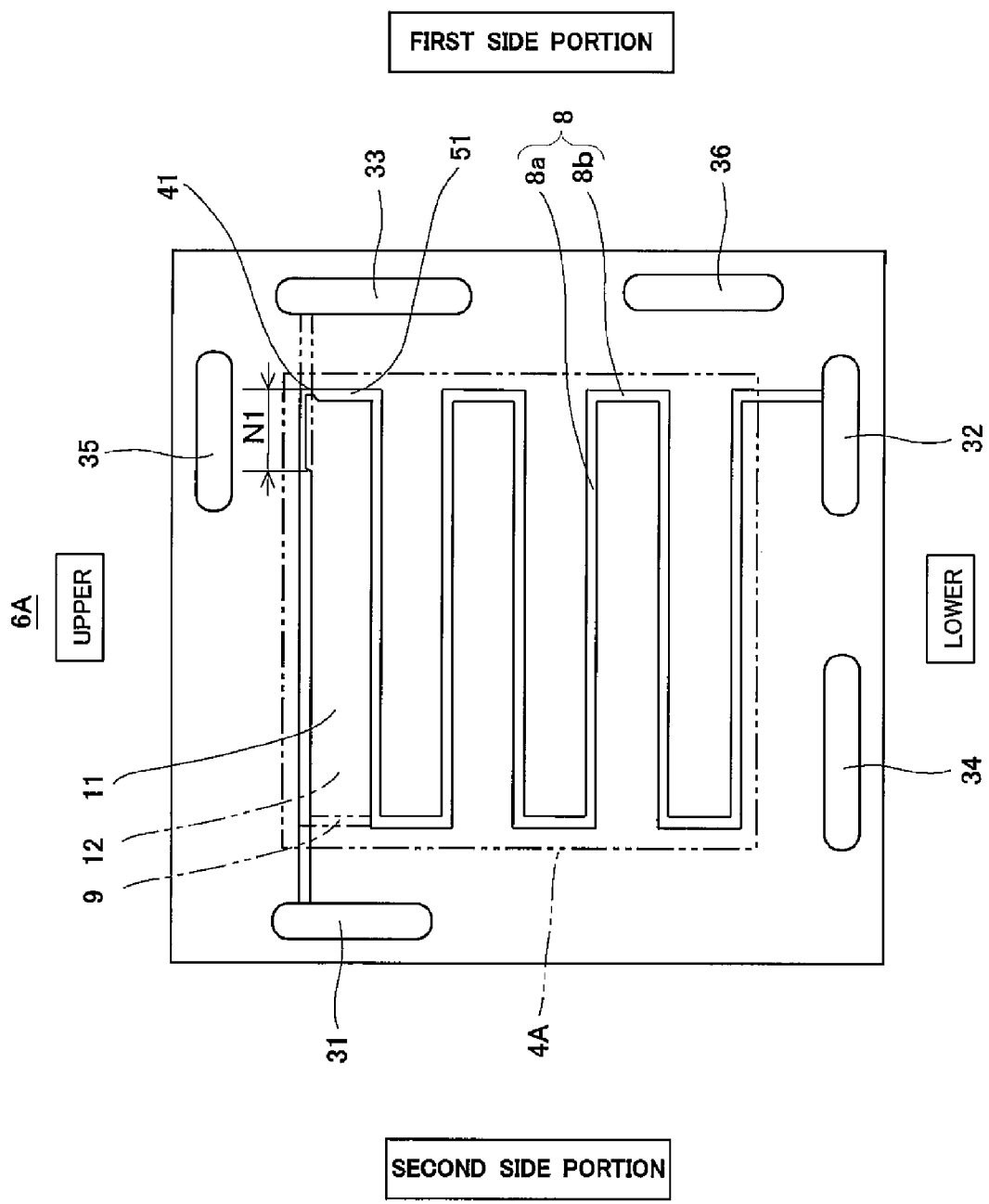
FIG. 6 is a schematic diagram showing the schematic configuration of the anode separator of the fuel cell of the fuel cell stack of Modification Example 2.

FIG. 6 is a schematic diagram showing the schematic configuration of the anode separator of the fuel cell of the fuel cell stack of Modification Example 2. In FIG. 6, the vertical direction of the anode separator is shown as the vertical direction of the drawing. Moreover, in FIG. 6, a part of the oxidizing gas channel is shown by virtual lines (chain double-dashed lines).

As shown in FIG. 6, the fuel cell stack 61 of Modification Example 2 is the same in basic configuration as the fuel cell stack 61 of Embodiment 1, but the configuration of the first particular portion 51 is different. Specifically, the first particular portion 51 of Modification Example 1 is constituted by a portion extending from the first portion 41 toward the upstream side of the first portion 41 by the predetermined distance N. To be specific, the upstream end of the first particular portion 51 is a portion located upstream of the first portion 41 and away from the first portion 41 by the predetermined distance N1, and the downstream end of the first particular portion 51 is the first portion 41.

Here, depending on the dew points of the fuel gas and the oxidizing gas (each of which is hereinafter referred to as the "reactant gas"), the temperature of the cooling medium, the widths of the fuel gas channel 8 and the oxidizing gas channel 9, and the like, the predetermined distance N1 may be equal to or shorter than the sum of the width of the oxidizing gas channel 9 and the width of the second rib portion 12 or may be equal to or shorter than the width of the oxidizing gas channel 9. The width of the second rib portion 12 denotes a length between the grooves (to be precise, the straight portions 9a) forming the second rib portion 12.

Even the fuel cell stack 61 (fuel cell 100) of Modification Example 2 configured as above can obtain the same operational advantages as the fuel cell stack 61 (fuel cell 100) of Embodiment 1.

Embodiment 2

Figure 7:
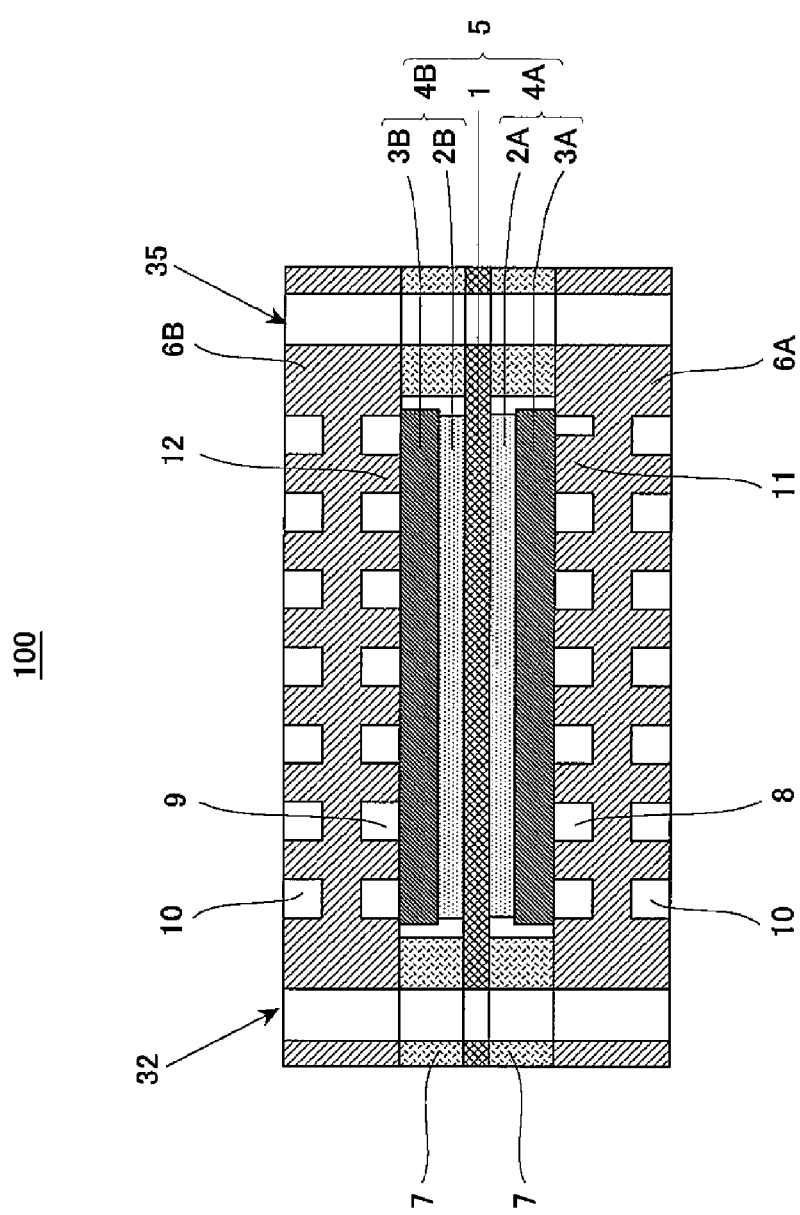
FIG. 7 is a cross-sectional view schematically showing the schematic configuration of the fuel cell of the fuel cell stack according to Embodiment 2 of the present invention.
Figure 8:
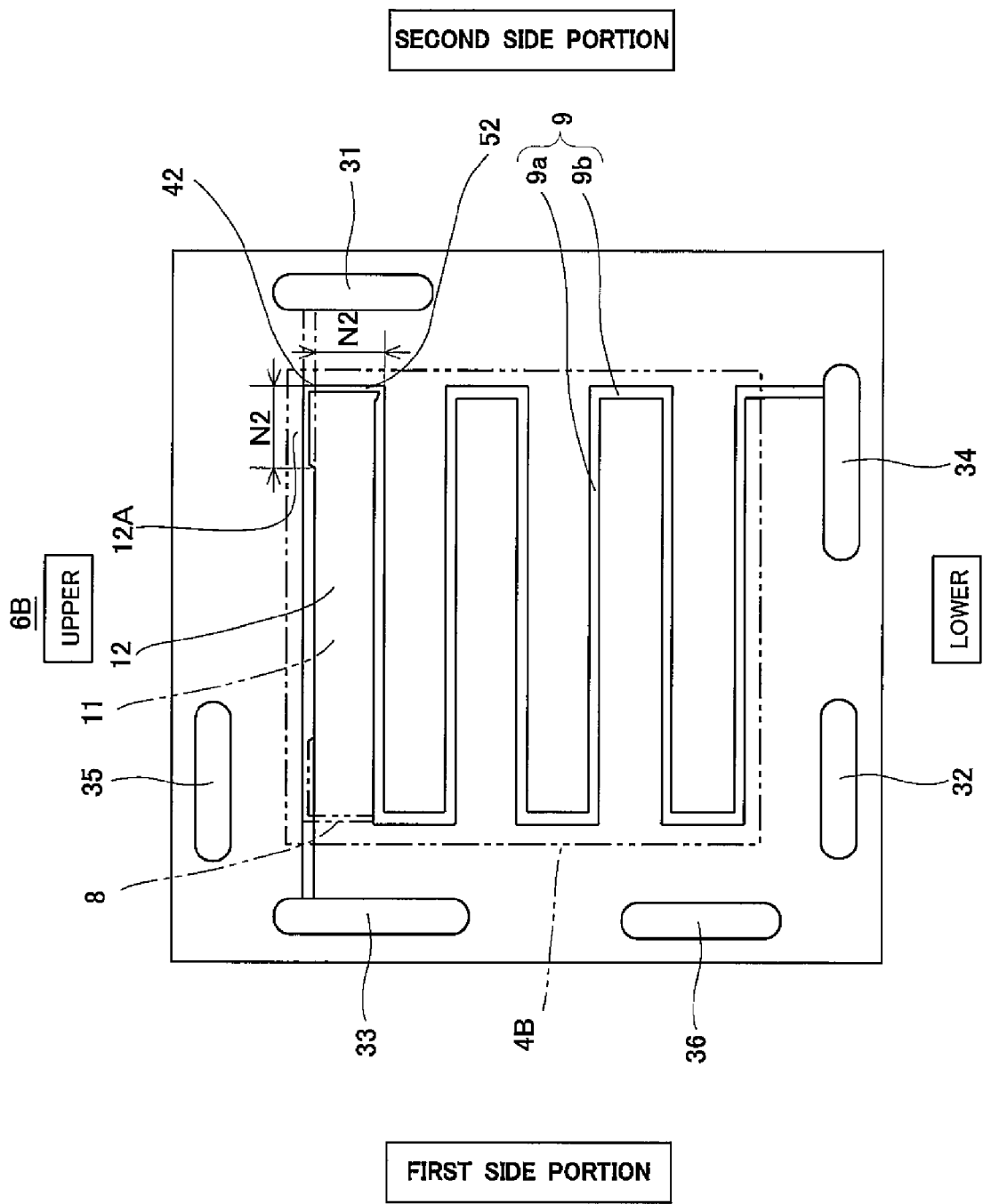
FIG. 8 is a schematic diagram showing the schematic configuration of an inner surface of a cathode separator of the fuel cell shown in FIG. 7.
Figure 9:
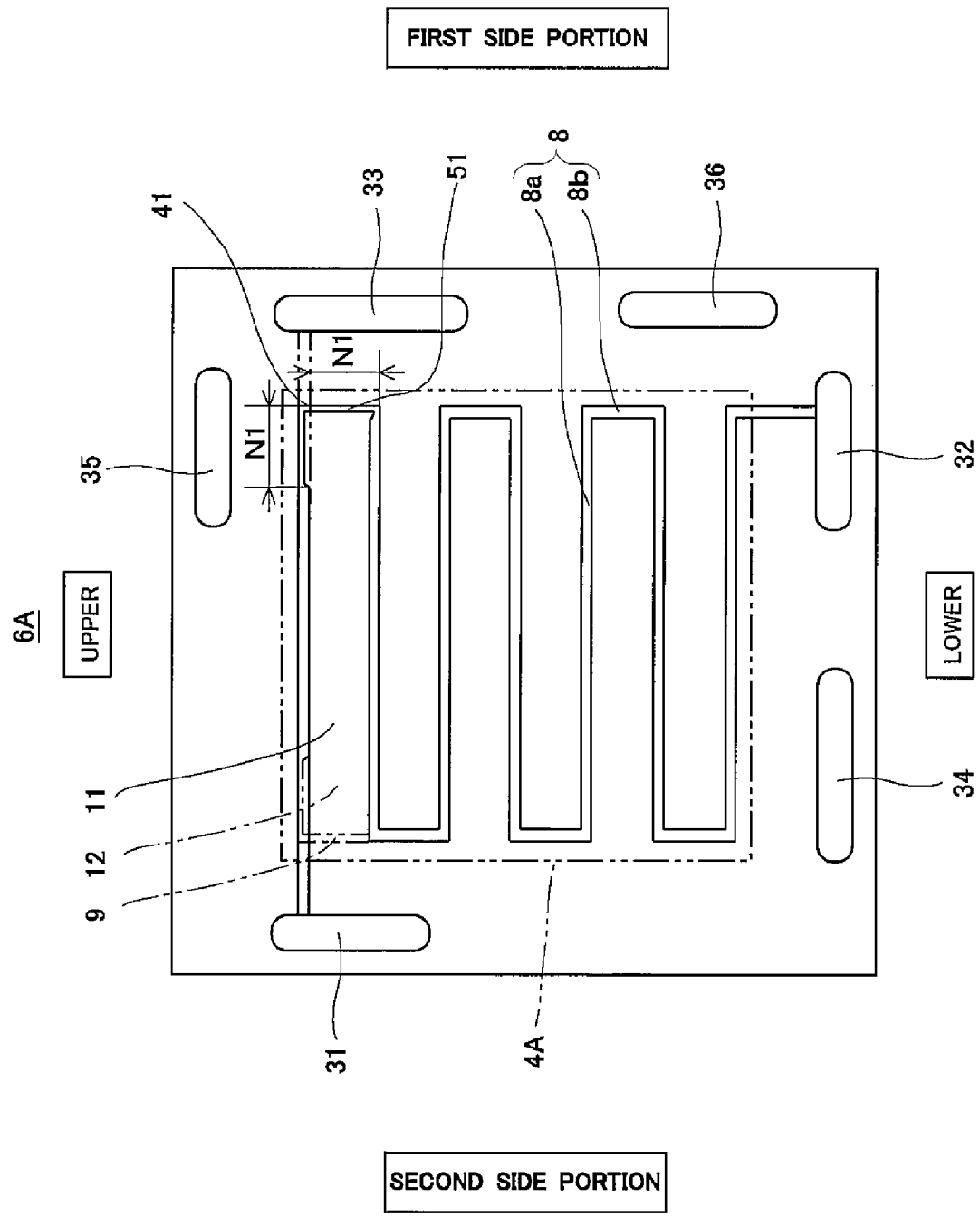
FIG. 9 is a schematic diagram showing the schematic configuration of an inner surface of the anode separator of the fuel cell shown in FIG. 7.

FIG. 7 is a cross-sectional view schematically showing the schematic configuration of the fuel cell of the fuel cell stack according to Embodiment 2 of the present invention. FIG. 8 is a schematic diagram showing the schematic configuration of the inner surface of the cathode separator of the fuel cell shown in FIG. 7. FIG. 9 is a schematic diagram showing the schematic configuration of the inner surface of the anode separator of the fuel cell shown in FIG. 7. In FIG. 8, the vertical direction of the cathode separator is shown as the vertical direction of the drawing, and a part of the fuel gas channel is shown by virtual lines (chain double-dashed lines). In FIG. 9, the vertical direction of the anode separator is shown as the vertical direction of the drawing, and a part of the oxidizing gas channel is shown by virtual lines (chain double-dashed lines).

As shown in FIGS. 7 to 9, the fuel cell stack (fuel cell 100) according to Embodiment 2 of the present invention is the same in basic configuration as the fuel cell stack 61 (fuel cell 100) according to Embodiment 1 but is different from the fuel cell stack 61 (fuel cell 100) according to Embodiment 1 in that a portion of the oxidizing gas channel 9 is formed to be smaller in width than the other portion of the oxidizing gas channel 9. Details will be explained below.

The oxidizing gas channel 9 includes a second portion 42. When viewed in the thickness direction of the anode separator 6A, the second portion 42 is a portion which is located in a region of the cathode electrode 4B (or the anode electrode 4A) (in a range where the anode electrode 4A (or the cathode electrode 4B) is formed) and from which the oxidizing gas channel 9 extending from an upstream end and overlapping the fuel gas channel 8 first separates. Specifically, in Embodiment 1, the second portion 42 is constituted by a downstream end of the first straight portion 9a (an upstream end of the first return portion 9b).

Further, the oxidizing gas channel 9 includes a second particular portion 52 including the second portion 42. In Embodiment 2, the second particular portion is constituted by a portion extending to the upstream side from the second portion 42 and a portion extending to the downstream side from the second portion 42. Specifically, an upstream end of the second particular portion 52 is a portion located upstream of the second portion 42 and away from the second portion 42 by a predetermined distance N2, and a downstream end of the second particular portion 52 is a portion located downstream of the second portion 42 and away from the second portion 42 by the predetermined distance N2.

Here, depending on the dew points of the fuel gas and the oxidizing gas (each of which is hereinafter referred to as the "reactant gas"), the temperature of the cooling medium, the widths of the fuel gas channel 8 and the oxidizing gas channel 9, and the like, the predetermined distance N2 may be equal to or shorter than a length corresponding to the sum of the width of the fuel gas channel 8 and the width of the first rib portion 11 or may be equal to or shorter than a length corresponding to the width of the fuel gas channel 8. The width of the first rib portion 11 denotes a length between the grooves (to be precise, the straight portions 8a) forming the first rib portion 11. Moreover, the width of the fuel gas channel 8 denotes a length in a direction perpendicular to a direction in which the fuel gas flows through the fuel gas channel 8 when viewed in the thickness direction of the anode separator 6A.

Then, the second particular portion 52 of the oxidizing gas channel 9 is formed so as to have a width smaller than the width of a portion of the oxidizing gas channel 9 other than the second particular portion 52.

With this, a portion of the cathode electrode 4B (hereinafter referred to as a "second particular portion of the cathode electrode 4B") can be reduced in size, the portion facing the second particular portion 52 of the oxidizing gas channel 9. In other words, by reducing the width of the second particular portion 52 of the oxidizing gas channel 9, the area of the second rib portion 12 (to be more precise, the second rib portion 12 formed in the vicinity of the second particular portion 52) formed between the grooves (to be precise, the straight portions 9a) forming the oxidizing gas channel 9 can be increased.

The fuel cell stack 61 (fuel cell 100) according to Embodiment 2 configured as above can obtain the same operational advantages as the fuel cell stack 61 (fuel cell 100) according to Embodiment 1. Moreover, in the fuel cell stack 61 (fuel cell 100) according to Embodiment 2, the drying of the second particular portion of the cathode electrode 4B can be suppressed by reducing the size of the second particular portion of the cathode electrode 4B, the second particular portion of the cathode electrode 4B being small in the amount of moisture contained therein. Therefore, the drying of the portion, facing the second particular portion 52 of the oxidizing gas channel 9 when viewed in the thickness direction of the anode separator 6A, of the polymer electrolyte membrane 1 can be suppressed.

Further, a portion, facing the second rib portion 12, of the cathode electrode 4B can be increased in size by increasing the area of the second rib portion 12 formed in the vicinity of the second particular portion 52 of the oxidizing gas channel 9, the portion of the cathode electrode 4B being large in the amount of moisture contained therein. Then, since the water moves from the portion of the cathode electrode 4B, the portion facing the second rib portion 12 and being large in the amount of moisture contained therein, to the second particular portion of the cathode electrode 4B, the second particular portion being small in the amount of moisture contained therein, the drying of the second particular portion of the cathode electrode 4B can be suppressed, and therefore, the drying of the portion, opposed to the second particular portion 52 of the oxidizing gas channel 9 when viewed in the thickness direction of the anode separator 6A, of the polymer electrolyte membrane 1 can be suppressed. On this account, in the fuel cell stack 61 (fuel cell 100) according to Embodiment 1, the deterioration of the polymer electrolyte membrane 1 can be suppressed.

In Embodiment 2, the first particular portion 51 of the fuel gas channel 8 is constituted by the portion extending to the upstream side from the first portion 41 of the fuel gas channel 8 and the portion extending to the downstream side from the first portion 41. However, the present embodiment is not limited to this. As with Modification Example 1, the first particular portion 51 of the fuel gas channel 8 may be constituted by the portion extending to the downstream side from the first portion 41. Moreover, as with Modification Example 2, the first particular portion 51 of the fuel gas channel 8 may be constituted by the portion extending to the upstream side from the first portion 41. Similarly, the second particular portion 52 of the oxidizing gas channel 9 is constituted by the portion extending to the upstream side from the second portion 42 of the oxidizing gas channel 9 and the portion extending to the downstream side from the second portion 42. However, the present embodiment is not limited to this. The second particular portion 52 of the oxidizing gas channel 9 may be constituted by the portion extending to the downstream side from the second portion 42 or the portion extending to the upstream side from the second portion 42.

Moreover, in Embodiment 2, the second rib portion 12 formed in the vicinity of the second particular portion 52 of the oxidizing gas channel 9 is configured to be large in area. However, the present embodiment is not limited to this. The second rib portion 12 formed in the vicinity of the second particular portion 52 of the oxidizing gas channel 9 may be configured to be the same in area as the other second rib portion 12, and a portion (hereinafter referred to as a "second outer rib portion 112A" (see FIG. 8)) of the inner surface of the cathode separator 6B may be configured to be large in area, the portion of the inner surface of the cathode separator 6B being located between an outer end of the cathode electrode 4B and the second particular portion 52 of the oxidizing gas channel 9 when viewed in the thickness direction of the anode separator 6A. In this case, a portion, facing the second outer rib portion 12A, of the cathode electrode 4B can be increased in area by increasing the area of the second outer rib portion 12A, the portion of the cathode electrode 4B being large in the amount of moisture contained therein. Then, since the water moves from the portion of the cathode electrode 4B, the portion facing the second outer rib portion 12A and being large in the amount of moisture contained therein, to the second particular portion of the cathode electrode 4B, the second particular portion being small in the amount of moisture contained therein, the drying of the second particular portion of the cathode electrode 4B can be suppressed, and therefore, the drying of the portion, facing the second particular portion 52 of the oxidizing gas channel 9 when viewed in the thickness direction of the anode separator 6A, of the polymer electrolyte membrane 1 can be suppressed.

Embodiment 3

Figure 10:
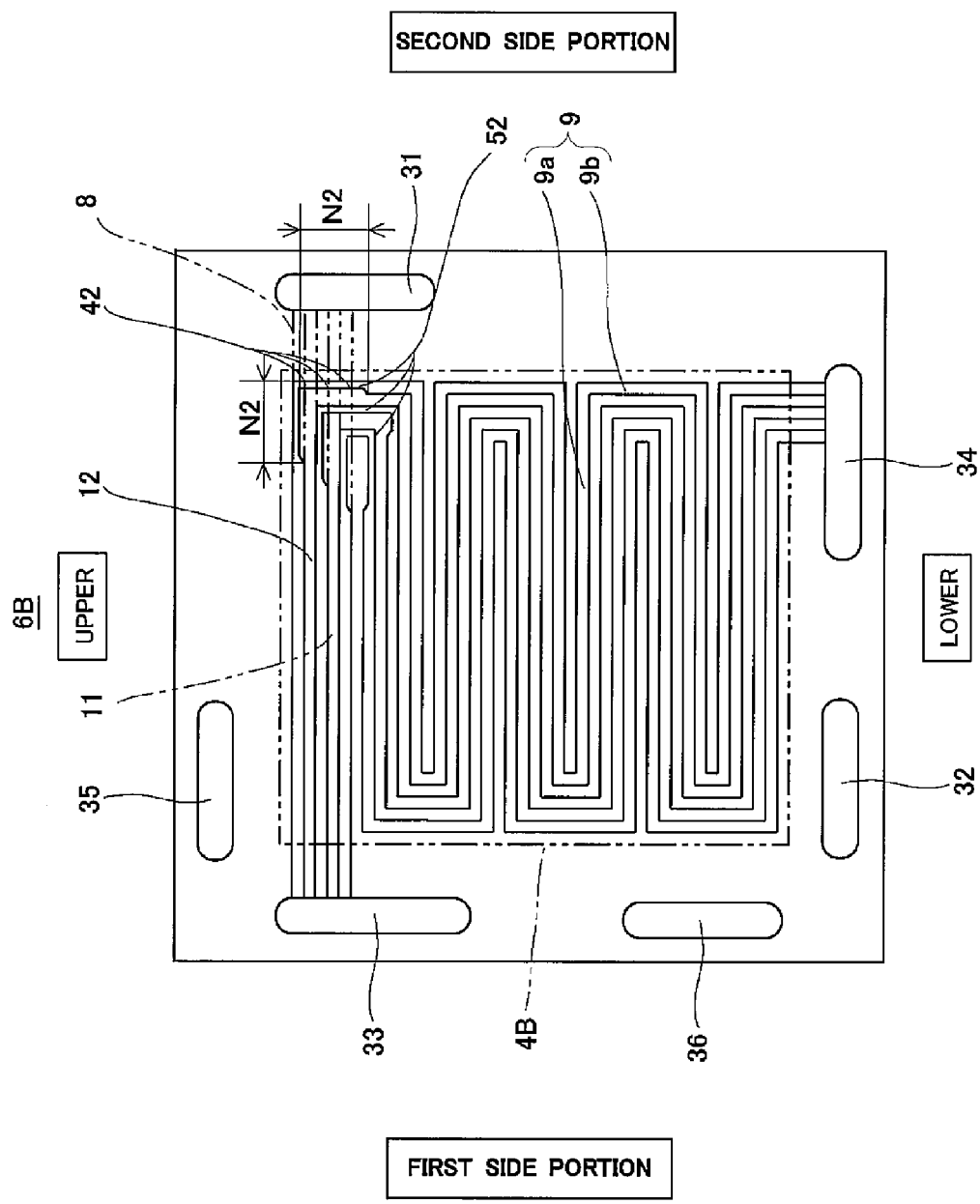
FIG. 10 is a schematic diagram showing the schematic configuration of the inner surface of the cathode separator of the fuel cell of the fuel cell stack according to Embodiment 3 of the present invention.
Figure 11:
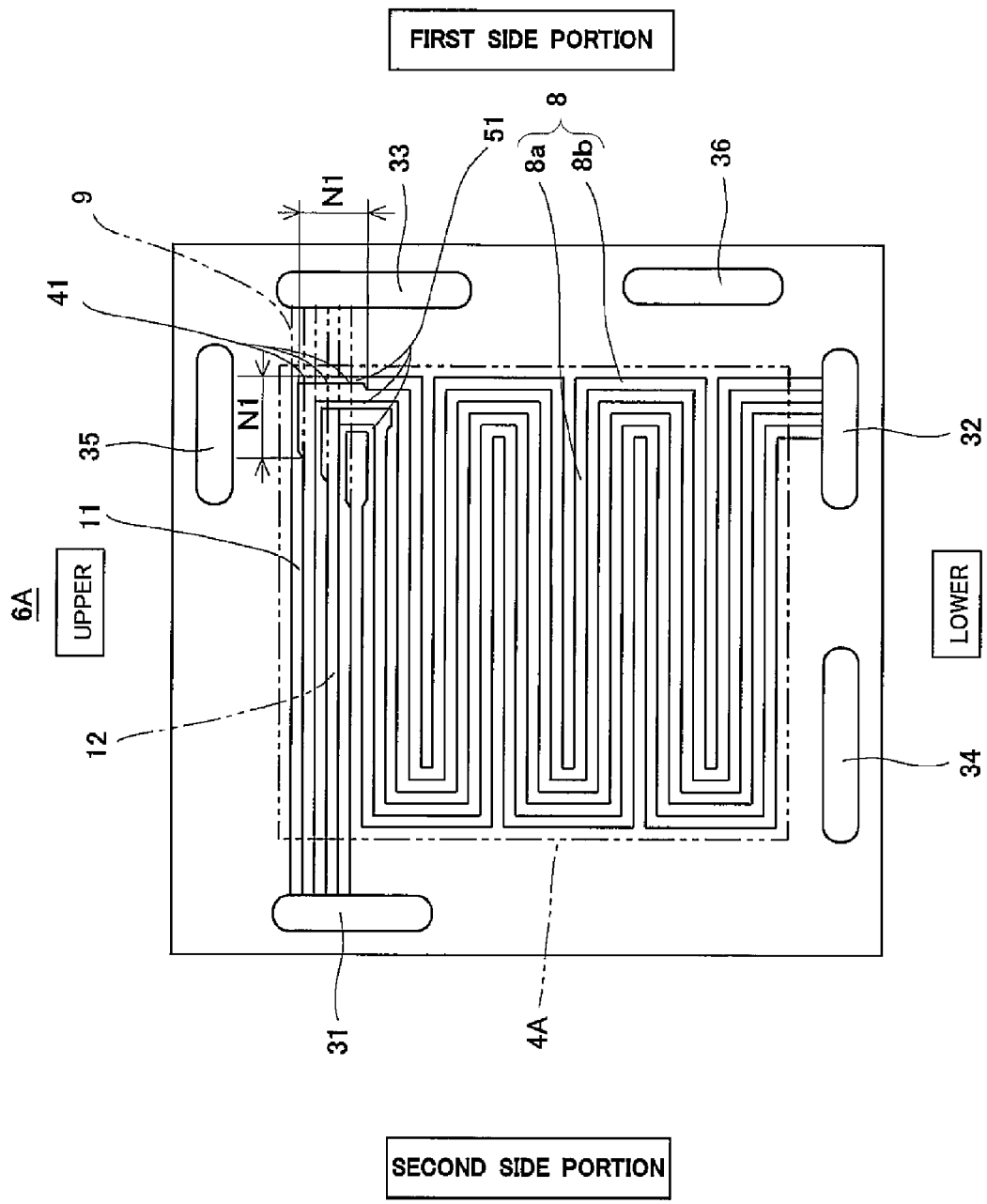
FIG. 11 is a schematic diagram showing the schematic configuration of the inner surface of the anode separator of the fuel cell of the fuel cell stack according to Embodiment 3 of the present invention.

FIG. 10 is a schematic diagram showing the schematic configuration of the inner surface of the cathode separator of the fuel cell of the fuel cell stack according to Embodiment 3 of the present invention. FIG. 11 is a schematic diagram showing the schematic configuration of the inner surface of the anode separator of the fuel cell of the fuel cell stack according to Embodiment 3 of the present invention. In FIG. 10, the vertical direction of the cathode separator is shown as the vertical direction of the drawing, and a part of the fuel gas channel is shown by virtual lines (chain double-dashed lines). Moreover, in FIG. 11, the vertical direction of the anode separator is shown as the vertical direction of the drawing, and a part of the oxidizing gas channel is shown by virtual lines (chain double-dashed lines).

As shown in FIGS. 10 and 11, the fuel cell stack 61 (fuel cell 100) according to Embodiment 3 of the present invention is the same in basic configuration as the fuel cell stack 61 (fuel cell 100) according to Embodiment 1 but is different from the fuel cell stack 61 (fuel cell 100) according to Embodiment 1 in that each of the fuel gas channel 8 and the oxidizing gas channel 9 is constituted by a plurality of (three in the present embodiment) channels (grooves).

Then, in Embodiment 3, as shown in FIG. 10, each of a plurality of oxidizing gas channels 9 is formed such that the second particular portion 52 is smaller in width than a portion other than the second particular portion 52. In Embodiment 3, the second particular portion 52 is constituted by the portion extending to the upstream side from the second portion 42 and the portion extending to the downstream side from the second portion 42. Specifically, the upstream end of the second particular portion 52 is a portion located upstream of the second portion 42 and away from the second portion 42 by the predetermined distance N2, and the downstream end of the second particular portion 52 is a portion located downstream of the second portion 42 and away from the second portion 42 by the predetermined distance N2.

Here, depending on the dew points of the fuel gas and the oxidizing gas (each of which is hereinafter referred to as the "reactant gas"), the temperature of the cooling medium, the widths of the fuel gas channel 8 and the oxidizing gas channel 9, and the like, the predetermined distance N2 may be equal to or shorter than a length obtained by summing up the sum of the widths of a plurality of (herein, three) fuel gas channels 8 and the sum of the widths of a plurality of (herein, two) first rib portions 11 formed among the plurality of (herein, three) fuel gas channels 8 (a length corresponding to the sum of the sum of the widths of a plurality of fuel gas channels 8 and the sum of the widths of a plurality of first rib portions 11 formed among the plurality of fuel gas channels 8) or may be equal to or shorter than a length corresponding to the width of the fuel gas channel 8. The width of the first rib portion 11 denotes a length between the grooves (to be precise, the straight portions 8a) forming the first rib portion 11.

Similarly, as shown in FIG. 11, each of a plurality of fuel gas channels 8 is formed such that the first particular portion 51 is smaller in width than a portion other than the first particular portion 51. In Embodiment 3, the first particular portion 51 is constituted by the portion extending to the upstream side from the first portion 41 and the portion extending to the downstream side from the first portion 41. Specifically, the upstream end of the first particular portion 51 is a portion located upstream of the first portion 41 and away from the first portion 41 by the predetermined distance N1, and the downstream end of the first particular portion 51 is a portion located downstream of the first portion 41 and away from the first portion 41 by the predetermined distance N1.

Here, depending on the dew points of the fuel gas and the oxidizing gas (each of which is hereinafter referred to as the "reactant gas"), the temperature of the cooling medium, the widths of the fuel gas channel 8 and the oxidizing gas channel 9, and the like, the predetermined distance N1 may be equal to or shorter than a length obtained by summing up the sum of the widths of a plurality of (herein, three) oxidizing gas channels 9 and the sum of the widths of a plurality of (herein, two) second rib portions 12 formed among the plurality of (herein, three) oxidizing gas channels 9 (a length corresponding to the sum of the widths of a plurality of oxidizing gas channels 9 and the sum of the widths of a plurality of second rib portions 12 formed among the plurality of oxidizing gas channels 9) or may be equal to or shorter than a length corresponding to the width of the oxidizing gas channel 9. The width of the second rib portion 12 denotes a length between the grooves (to be precise, the straight portions 9a) forming the second rib portion 12.

Even the fuel cell stack 61 (fuel cell 100) according to Embodiment 3 configured as above can obtain the same operational advantages as the fuel cell stack 61 (fuel cell 100) according to Embodiment 1.

In Embodiment 3, each of the plurality of channels is formed such that the first particular portion 51 or the second particular portion 52 is smaller in width than a portion other than the first particular portion 51 or the second particular portion 52. However, the present embodiment is not limited to this. At least one of the plurality of channels may be formed such that the first particular portion 51 or the second particular portion 52 is smaller in width than the portion other than the first particular portion 51 or the second particular portion 52. The number of channels formed such that the first particular portion 51 or the second particular portion 52 is small in width is set arbitrarily.

Moreover, to efficiently suppress the drying of the polymer electrolyte membrane 1, it is preferable that the first particular portion 51 of the fuel gas channel 8 having the (outermost) first portion 41 closest to the peripheral portion of the anode electrode 4A among a plurality of fuel gas channels 8 be smaller in width than a portion other than the first particular portion 51. To further suppress the drying of the polymer electrolyte membrane 1, it is preferable that the number of channels formed such that the first particular portion 51 is smaller in width than the portion other than the first particular portion 51 be large. Similarly, it is preferable that the second particular portion 52 of the oxidizing gas channel 9 having the (outermost) second portion 42 closest to the peripheral portion of the cathode electrode 4B among a plurality of oxidizing gas channels 9 be smaller in width than a portion other than the second particular portion 52. To further suppress the drying of the polymer electrolyte membrane 1, it is preferable that the number of channels formed such that the second particular portion 52 is smaller in width than the portion other than the second particular portion 52 be large.

The upstream end of each of a plurality of first particular portions 51 is a portion located upstream of the first portion 41 and away from the first portion 41 by the predetermined distance N1. However, the present embodiment is not limited to this. For example, the upstream end of the outermost first particular portion 51 may be a portion located upstream of the first portion 41 and away from the first portion 41 by the predetermined distance N1, and the upstream end of each of the first particular portions 51 other than the outermost first particular portion 51 may be a portion located upstream of the first portion 41 and away from the first portion 41 by a distance shorter than the predetermined distance N1. Moreover, the downstream end of each of a plurality of first particular portions is a portion located downstream of the first portion 41 and away from the first portion 41 by the predetermined distance N1. However, the present embodiment is not limited to this. The downstream end of the outermost first particular portion 51 may be a portion located downstream of the first portion 41 and away from the first portion 41 by the predetermined distance N1, and the downstream end of each of the first particular portions 51 other than the outermost first particular portion 51 may be a portion located downstream of the first portion 41 and away from the first portion 41 by a distance shorter than the predetermined distance N1.

Similarly, the upstream end of each of a plurality of second particular portions 52 is a portion located upstream of the second portion 42 and away from the second portion 42 by the predetermined distance N2. However, the present embodiment is not limited to this. For example, the upstream end of the outermost second particular portion 52 may be a portion located upstream of the second portion 42 and away from the second portion 42 by the predetermined distance N2, and the upstream end of each of the second particular portions 52 other than the outermost second particular portion 52 may be a portion located upstream of the second portion 42 and away from the second portion 42 by a distance shorter than the predetermined distance N2. Moreover, the downstream end of each of a plurality of second particular portions is a portion located downstream of the second portion 42 and away from the second portion 42 by the predetermined distance N2. However, the present embodiment is not limited to this. The downstream end of the outermost second particular portion 52 may be a portion located downstream of the second portion 42 and away from the second portion 42 by the predetermined distance N2, and the downstream end of each of the second particular portions 52 other than the outermost second particular portion 52 may be a portion located downstream of the second portion 42 and away from the second portion 42 by a distance shorter than the predetermined distance N2.

Moreover, in Embodiment 3, the first particular portion 51 is constituted by the portion located upstream of the first portion 41 and the portion located downstream of the first portion 41. However, the present embodiment is not limited to this. The first portion 41 may be constituted only by the portion located upstream of the first portion 41 or the portion located downstream of the first portion 41. Similarly, the second particular portion 52 is constituted by the portion located upstream of the second portion 42 and the portion located downstream of the second portion 42. However, the present embodiment is not limited to this. The second particular portion 52 may be constituted only by the portion located upstream of the second portion 42 or the portion located downstream of the second portion 42.

Further, in Embodiment 3, the first particular portion 51 is formed so as to be smaller in width than a portion other than the first particular portion 51, and the second particular portion 52 is formed so as to be smaller in width than a portion other than the second particular portion 52. However, the present embodiment is not limited to this. Only the first particular portion 51 may be formed so as to be smaller in width than the portion other than the first particular portion 51, or only the second particular portion 52 may be formed so as to be smaller in width than the portion other than the second particular portion 52.

Embodiment 4

Figure 12:
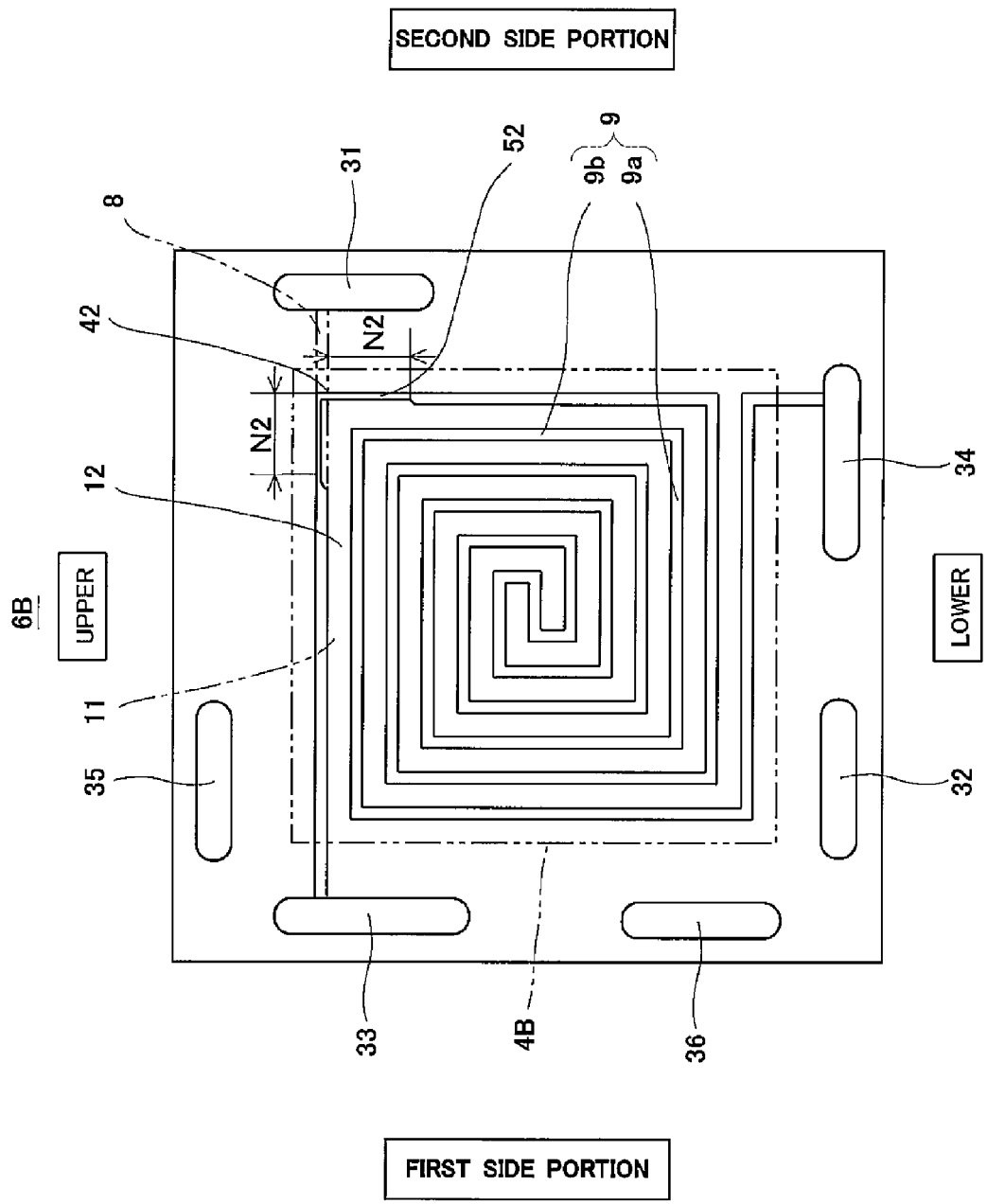
FIG. 12 is a schematic diagram showing the schematic configuration of the inner surface of the cathode separator of the fuel cell of the fuel cell stack according to Embodiment 4 of the present invention.
Figure 13:
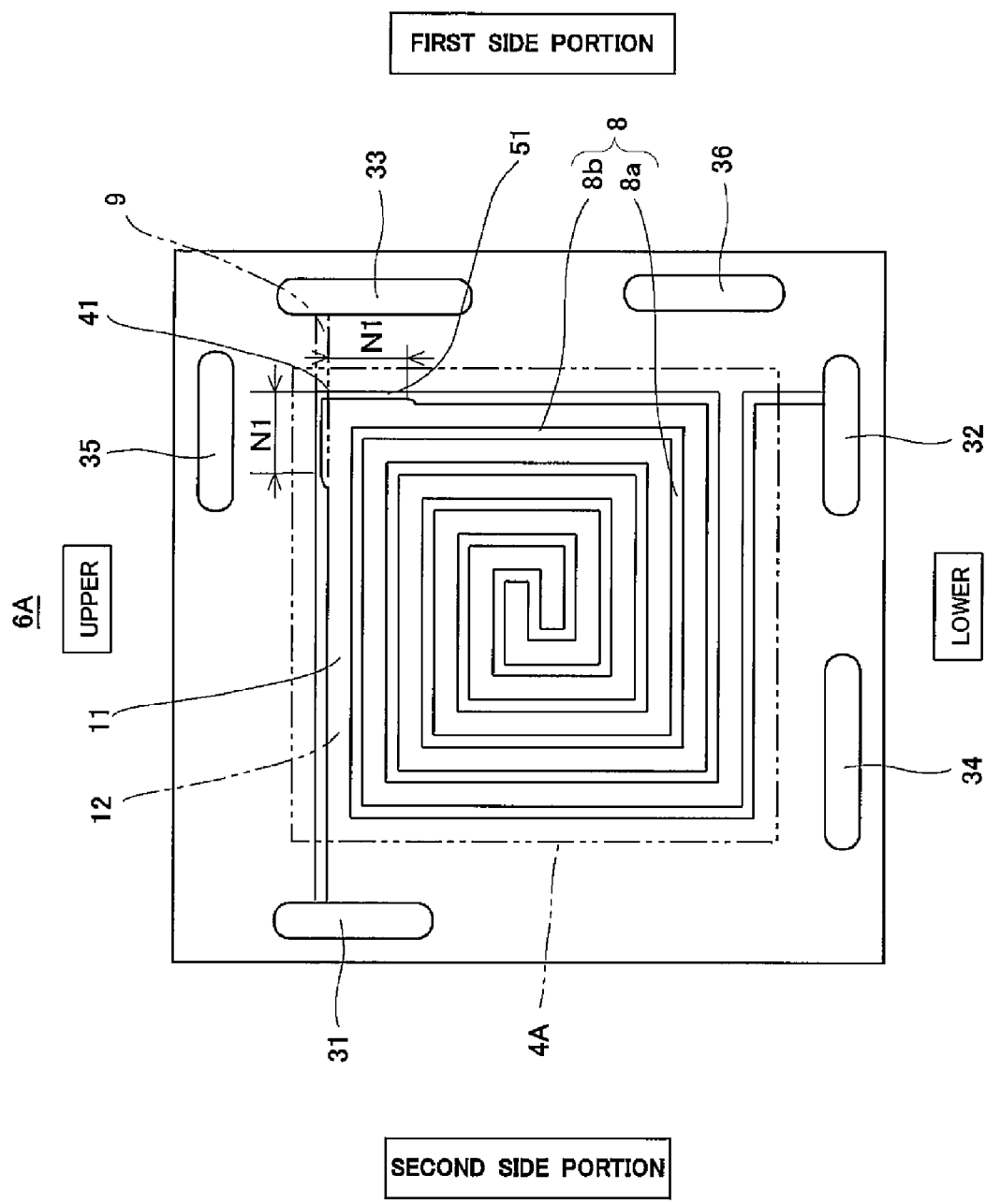
FIG. 13 is a schematic diagram showing the schematic configuration of the inner surface of the anode separator of the fuel cell of the fuel cell stack according to Embodiment 4 of the present invention.

FIG. 12 is a schematic diagram showing the schematic configuration of the inner surface of the cathode separator of the fuel cell of the fuel cell stack according to Embodiment 4 of the present invention. FIG. 13 is a schematic diagram showing the schematic configuration of the inner surface of the anode separator of the fuel cell of the fuel cell stack according to Embodiment 4 of the present invention. In FIG. 12, the vertical direction of the cathode separator is shown as the vertical direction of the drawing, and a part of the fuel gas channel is shown by virtual lines (chain double-dashed lines). Moreover, in FIG. 13, the vertical direction of the anode separator is shown as the vertical direction of the drawing, and a part of the oxidizing gas channel is shown by virtual lines (chain double-dashed lines).

As shown in FIGS. 12 and 13, the fuel cell stack 61 (fuel cell 100) according to Embodiment 4 of the present invention is the same in basic configuration as the fuel cell stack 61 (fuel cell 100) according to Embodiment 1 but is different from the fuel cell stack 61 (fuel cell 100) according to Embodiment 1 in that each of the fuel gas channel 8 and the oxidizing gas channel 9 is formed in a spiral shape.

As shown in FIG. 12, the oxidizing gas channel 9 is practically constituted by horizontal portions 9a formed to extend in the horizontal direction and vertical portions 9b formed to extend in the vertical direction. The oxidizing gas channel 9 extends so as to converge from the peripheral portion to the center portion of the cathode separator 6B in a clockwise direction, turn round at the center portion of the cathode separator 6B, and spread toward the peripheral portion of the cathode separator 6B in a counterclockwise direction. Here, the center portion of the cathode separator 6B denotes a center portion with respect to an outer periphery of the cathode separator 6B. Then, the second portion 42 of the oxidizing gas channel 9 is a downstream end of the first horizontal portion 9a (an upstream end of the first vertical portion 9b).

Similarly, as shown in FIG. 13, the fuel gas channel 8 is practically constituted by horizontal portions 8a formed to extend in the horizontal direction and vertical portions 8b formed to extend in the vertical direction. The fuel gas channel 8 extends so as to converge from the peripheral portion to the center portion of the anode separator 6A in a clockwise direction, turn round at the center portion of the anode separator 6A, and spread toward the peripheral portion of the anode separator 6A in a counterclockwise direction. Here, the center portion of the anode separator 6A is a center portion with respect to an outer periphery of the anode separator 6A. Then, the first portion 41 of the fuel gas channel 8 is a downstream end of the first horizontal portion 8a (an upstream end of the first vertical portion 8b).

Even the fuel cell stack 61 (fuel cell 100) according to Embodiment 4 of the present invention configured as above can obtain the same operational advantages as the fuel cell stack 61 (fuel cell 100) according to Embodiment 1.

In Embodiment 4, each of the fuel gas channel 8 and the oxidizing gas channel 9 is formed in a spiral shape. However, the present embodiment is not limited to this. Only the fuel gas channel 8 may be formed in a spiral shape, or only the oxidizing gas channel 9 may be formed in a spiral shape.

Moreover, in Embodiment 4, each of the fuel gas channel 8 and the oxidizing gas channel 9 is constituted by one groove (channel). However, the present embodiment is not limited to this. Each of the fuel gas channel 8 and the oxidizing gas channel 9 may be constituted by a plurality of grooves (channels).

Moreover, the first particular portion 51 of the fuel gas channel 8 is constituted by the portion located upstream of the first portion 41 and the portion located downstream of the first portion 41. However, the present embodiment is not limited to this. The first particular portion 51 of the fuel gas channel 8 may be constituted only by the portion located upstream of the first portion 41 or only by the portion located downstream of the first portion 41. Similarly, the second particular portion 52 is constituted by the portion located upstream of the second portion 42 and the portion located downstream of the second portion 42. However, the present embodiment is not limited to this. The second particular portion 52 may be constituted only by the portion located upstream of the second portion 42 or only by the portion located downstream of the second portion 42.

Further, in Embodiment 4, the first particular portion 51 is formed so as to be smaller in width than a portion other than the first particular portion 51, and the second particular portion 52 is formed so as to be smaller in width than a portion other than the second particular portion 52. However, the present embodiment is not limited to this. Only the first particular portion 51 may be formed so as to be smaller in width than the portion other than the first particular portion 51, or only the second particular portion 52 may be formed so as to be smaller in width than the portion other than the second particular portion 52.

In Embodiments 1 to 4 described above, the fuel gas channel 8 and the oxidizing gas channel 9 are formed so as to be the same in width as each other. However, the present embodiment is not limited to this. The fuel gas channel 8 and the oxidizing gas channel 9 may be formed so as to be different in width from each other. As long as the operational advantages of the present invention can be obtained, a part of the first particular portion 51 of the fuel gas channel 8 may be formed so as to be larger in width than the portion of the fuel gas channel 8 other than the first particular portion 51, and a part of the portion of the fuel gas channel 8 other than the first particular portion 51 may be formed so as to be smaller in width than the first particular portion 51 of the fuel gas channel 8. Similarly, as long as the operational advantages of the present invention can be obtained, the second particular portion 52 of the oxidizing gas channel 9 may be formed so as to be larger in width than the portion of the oxidizing gas channel 9 other than the second particular portion 52, and a part of the portion of the oxidizing gas channel 9 other than the second particular portion 52 may be formed so as to be smaller in width than the second particular portion 52 of the oxidizing gas channel 9.

Moreover, in Embodiments 1 to 4 described above, the first particular portion 51 of the fuel gas channel 8 and the portion other than the first particular portion 51 are formed so as to be the same in depth as each other. However, the present embodiment is not limited to this. To set channel resistance of the first particular portion 51 and channel resistance of the portion other than the first particular portion 51 such that these channel resistances become equal to each other, the first particular portion 51 may be formed so as to be larger in depth than the portion other than the first particular portion 51. Similarly, in Embodiments 1 to 4 described above, the second particular portion 52 of the oxidizing gas channel 9 and the portion other than the second particular portion 52 are formed so as to be the same in depth as each other. However, the present embodiment is not limited to this. To set channel resistance of the second particular portion 52 and channel resistance of the portion other than the second particular portion 52 such that these channel resistances become equal to each other, the second particular portion 52 may be formed so as to be larger in depth than the portion other than the second particular portion 52.

Moreover, in Embodiments 1 to 4 described above, the positions of the fuel gas supply manifold hole 31, the fuel gas discharge manifold hole 32, the oxidizing gas supply manifold hole 33, the oxidizing gas discharge manifold hole 34, the cooling medium supply manifold hole 35, and the cooling medium discharge manifold hole 36 are not limited to the above. For example, in Embodiments 1 to 4 described above, the oxidizing gas supply manifold holes (second reactant gas supply manifold holes) 33 are formed so as to be respectively located at the upper portion of the first side portion of the cathode separator 6B and at the upper portion of the first side portion of the anode separator 6A. However, the present embodiment is not limited to this. For example, the oxidizing gas supply manifold hole (second reactant gas supply manifold hole) 33 may be formed at the first side portion and above the oxidizing gas channel 9 of the cathode separator 6B, and the oxidizing gas supply manifold hole (second reactant gas supply manifold hole) 33 may be formed at the first side portion and above the fuel gas channel 8 of the anode separator 6A. In this case, the groove constituting the oxidizing gas channel 9 of the cathode separator 6B may be formed so as to extend downward from the oxidizing gas supply manifold hole 33 by a certain distance and extend therefrom in the horizontal direction toward the second side portion by a certain distance.

Moreover, For example, in Embodiments 1 to 4 described above, the fuel gas supply manifold holes (first reactant gas supply manifold holes) 31 are formed so as to be respectively located at the upper portion of the second side portion of the cathode separator 6B and at the upper portion of the second side portion of the anode separator 6A. However, the present embodiment is not limited to this. For example, the fuel gas supply manifold hole (first reactant gas supply manifold hole) 31 may be formed at the second side portion and above the oxidizing gas channel 9 of the cathode separator 6B, and the fuel gas supply manifold hole (first reactant gas supply manifold hole) 31 may be formed at the second side portion and above the fuel gas channel 8 of the anode separator 6A. In this case, the groove constituting the fuel gas channel 8 of the anode separator 6A may be formed so as to extend downward from the fuel gas supply manifold hole 31 by a certain distance and extend therefrom in the horizontal direction toward the first side portion by a certain distance.

Further, in Embodiments 1 to 4 described above, a so-called inner manifold type fuel cell is adopted. However, the present embodiment is not limited to this. A so-called outer manifold type fuel cell may be adopted. Moreover, in Embodiments 1 to 4 described above, the fuel gas channel 8 and the oxidizing gas channel 9 are formed so as to realize so-called parallel flow. However, the present embodiment is not limited to this. The fuel gas channel 8 and the oxidizing gas channel 9 may be formed so as to realize so-called opposed flow.

Embodiment 5

Configuration of Fuel Cell System

FIG. 14 is a schematic diagram showing the schematic configuration of a fuel cell system according to Embodiment 5 of the present invention.

As shown in FIG. 14, a fuel cell system 200 according to Embodiment 5 of the present invention includes the fuel cell stack 61 (fuel cell 100) according to Embodiment 1, a fuel processor (first reactant gas supply unit) 101, an oxidizing gas supply unit (second reactant gas supply unit) 102, a cooling medium supply unit 103, and a controller 110. The controller 110 controls the fuel processor 101, the oxidizing gas supply unit 102, and the cooling medium supply unit 103 such that each of the dew point of the fuel gas flowing through the fuel gas channel 8 and the dew point of the oxidizing gas flowing through the oxidizing gas channel 9 becomes lower than the temperature of the cooling medium flowing through the cooling medium channel 10.

The fuel processor 101 includes a reformer (not shown), a material supply unit 101A, a water supply unit 101B, and a burner 101C. The material supply unit 101A may be any device as long as it can supply a material to the reformer while adjusting the flow rate of the material. For example, the material supply unit 101A may be constituted by a flow rate control valve or a booster pump. Or, the material supply unit 101A may be constituted by a combination of a booster pump and a flow rate control valve. The water supply unit 101B may be any device as long as it can supply water to the reformer while adjusting the flow rate of the water. For example, the water supply unit 101B may be a flow rate adjuster configured to adjust the flow rate of the water. The flow rate adjuster may be constituted by a flow rate control valve or a pump. Or, the flow rate adjuster may be constituted by a combination of a pump and a flow rate control valve.

As the material, a material containing an organic compound containing at least carbon and hydrogen as constituent elements can be used. Examples of the organic compound are hydrocarbons, such as ethane and propane. In Embodiment 5, a gas, such as a city gas (natural gas) or a LP gas, supplied from a gas infrastructure line is used. The material supply unit 101A may be configured to include a deodorizer configured to remove odorous components (such as mercaptan) contained in, for example, the city gas (natural gas) containing methane as a major component. In this case, the deodorizer may be configured to include activated carbon or a filter, may be configured to use a zeolite-based adsorbent which removes the odorous components by adsorption, or may be configured to use a hydrodesulfurization catalyst.

The reformer of the fuel processor 101 includes a reforming catalyst which causes a reforming reaction between the material and the water to generate a hydrogen-containing gas. The reformer causes the reforming reaction between the material gas supplied from the material supply unit 101A and the water supplied from the water supply unit 101B to generate the hydrogen-containing gas and supplies the generated hydrogen-containing gas as the fuel gas to a fuel gas supply passage 151.

The fuel processor 101 is connected via the fuel gas supply passage 151 to an entrance of a fuel gas inner channel 61A of the fuel cell stack 61. The fuel gas inner channel 61A includes the fuel gas supply manifold 131, the fuel gas channel 8, and the fuel gas discharge manifold 132 (see FIGS. 1 and 2, for example). The burner 101C is connected via an off fuel gas passage 152 to an exit of the fuel gas inner channel 61A.

A combustion air supplying device (not shown) is connected via a combustion air supply passage (not shown) to the burner 101C. Combustion fuel and combustion air are supplied to the burner 101C. The burner 101C combusts the combustion fuel and the combustion air to generate a flue gas. The generated flue gas heats the reformer and the like, and then flows through a flue gas passage (not shown) to be discharged to the outside of the fuel cell system 200. Examples of the combustion fuel are the hydrogen-containing gas generated in the reformer and the material.

In Embodiment 5, the hydrogen-containing gas generated in the reformer is supplied to the fuel gas supply passage 151. However, the present embodiment is not limited to this. For example, the fuel cell system 200 may be configured such that: a shift converter including a shift catalyst (for example, copper-zinc-based catalyst) for reducing carbon monoxide in the hydrogen-containing gas supplied from the reformer and a carbon monoxide remover including an oxidation catalyst (for example, ruthenium-based catalyst) or a methanation catalyst (for example, ruthenium-based catalyst) are provided in the fuel gas supply unit 101; and the hydrogen-containing gas having passed through the shift converter and the carbon monoxide remover is supplied to the fuel gas supply passage 151.

The oxidizing gas supply unit 102 may be any device as long as it can supply the oxidizing gas (air) to the fuel cell stack 61 (fuel cell 100) while adjusting the flow rate and humidification amount of the oxidizing gas. In Embodiment 5, the oxidizing gas supply unit 102 includes a fan, such as a blower or a sirocco fan, and a total enthalpy heat exchanger 104 (see FIGS. 1 and 2, for example). The oxidizing gas supply unit 102 is connected via an oxidizing gas supply passage 153 to an entrance of an oxidizing gas inner channel 61B of the fuel cell stack 61. The oxidizing gas inner channel 61B includes the oxidizing gas supply manifold 133, the oxidizing gas channel 9, and the oxidizing gas discharge manifold 134. An off oxidizing gas passage 154 is connected to an exit of the oxidizing gas inner channel 61B. The total enthalpy heat exchanger 104 is disposed on both the oxidizing gas supply passage 153 and the off oxidizing gas passage 154.

The total enthalpy heat exchanger 104 may be any device as long as it can humidify the oxidizing gas supplied to the oxidizing gas inner channel 61B. For example, a static total enthalpy heat exchanger configured by stacking a plurality of cells each including a separator through which a primary fluid flows, a steam permeable membrane, and a separator through which a secondary fluid flows may be used as the total enthalpy heat exchanger 104. In this case, the humidification amount of the oxidizing gas supplied to the oxidizing gas inner channel 61B may be reduced by reducing the area of the steam permeable membrane or reducing the number of cells stacked. With this, the dew point of the oxidizing gas flowing through the oxidizing gas channel 9 can be set to be lower than the temperature of the cooling medium flowing through the cooling medium channel 10.

In Embodiment 5, the oxidizing gas supplied to the oxidizing gas inner channel 61B is humidified by the total enthalpy heat exchanger 104 configured to perform total enthalpy heat exchange with an off oxidizing gas. However, the present embodiment is not limited to this. For example, in a case where the cooling medium flowing through the cooling medium channel 10 is water, a total enthalpy heat exchanger configured to perform total enthalpy heat exchange with the cooling medium may be provided and the oxidizing gas may be humidified by this total enthalpy heat exchanger, or a total enthalpy heat exchanger configured to perform total enthalpy heat exchange with an off fuel gas and the oxidizing gas may be humidified by this total enthalpy heat exchanger. Moreover, the oxidizing gas may be humidified by a so-called humidifier configured to generate steam from water stored in a tank or the like to humidify the oxidizing gas. In this case, the controller 110 may control the humidifier such that the dew point of the oxidizing gas flowing through the oxidizing gas channel 9 becomes lower than the temperature of the cooling medium flowing through the cooling medium channel 10. Specifically, the controller 110 controls the humidifier such that the humidification amount of the humidifier becomes small.

The fuel cell stack 61 is provided with a cooling medium inner channel 61C. The cooling medium inner channel 61C includes the cooling medium supply manifold 135, the cooling medium channel 10, and the cooling medium discharge manifold 136 (see FIGS. 1 and 2, for example). A cooling medium circulation passage 155 is connected to the cooling medium inner channel 61C. The cooling medium supply unit 103 and a cooling medium tank 105 are respectively disposed on portions of the cooling medium circulation passage 155.

The cooling medium supply unit 103 may be any device as long as it can supply the cooling medium to the cooling medium channel 10 while adjusting the flow rate and temperature of the cooling medium. The cooling medium supply unit 103 may include, for example, a temperature adjuster and a flow rate adjuster configured to adjust the flow rate of the water. The flow rate adjuster may be constituted by a pump. Or, the flow rate adjuster may be constituted by a combination of a pump and a flow rate control valve. Moreover, the temperature adjuster may be constituted by, for example, an electric heater.

The controller 110 may be any device as long as it controls respective devices constituting the fuel cell system 200. The controller 110 includes a calculation processing portion, such as a microprocessor or a CPU, and a storage portion which is constituted by a memory and the like and stores programs for executing respective control operations. In the controller 110, the calculation processing portion reads out and executes a predetermined control program stored in the storage portion. Thus, the controller 110 processes these information and performs various control operations regarding the fuel cell system 200 including the above control operations.

The controller 110 may be constituted by one controller or may be constituted by a group of a plurality of controllers which cooperate together to execute the control operations of the fuel cell system 200. Moreover, the controller 110 may be constituted by a microcontroller or may be constituted by a MPU, a PLC (programmable logic controller), a logic circuit, or the like.

Operations of Fuel Cell System

Next, the operation (electric power generating operation) of the fuel cell system 200 according to Embodiment 5 will be explained in reference to FIG. 14.

First, when the controller 110 receives an activation command of the fuel cell system 200, it outputs operation start commands to respective devices constituting the fuel cell system 200. Examples of the activation command of the fuel cell system 200 are a case where a user of the fuel cell system 200 operates a remote controller, not shown, to instruct the operation start of the fuel cell system 200 and a case where a preset operation start time of the fuel cell system 200 comes.

Next, the controller 110 causes the material supply unit 101A to supply the material as the combustion fuel to the burner 101C via the reformer of the fuel processor 101, the fuel gas supply passage 151, the fuel gas inner channel 61A, and the off fuel gas passage 152. Moreover, the controller 110 causes the combustion air supplying device to supply the combustion air to the burner 101C. The burner 101C combusts the supplied material and combustion air to generate the flue gas. The generated flue gas heats the reformer of the fuel processor 101 and the like, and then flows through the flue gas passage (not shown) to be discharged to the outside of the fuel cell system 200.

Next, when the reformer of the fuel processor 101 is adequately heated, the controller 110 causes the water supply unit 101B to supply the water to the reformer. The reformer causes the reforming reaction between the supplied material and water to generate the hydrogen-containing gas. The carbon monoxide in the generated hydrogen-containing gas (containing steam) is reduced by, for example, the shift converter, and the hydrogen-containing gas is then supplied as the fuel gas through the fuel gas supply passage 151 to the fuel gas inner channel 61A of the fuel cell stack 61. While the fuel gas supplied to the fuel gas inner channel 61A flows through the fuel gas inner channel 61A, it is supplied to the fuel gas channel 8 of the fuel cell 100. At this time, the controller 110 may control (reduce) the operation amount of the water supply unit 101B to adjust the steam content in the fuel gas such that the dew point of the fuel gas supplied to the fuel gas channel 8 of the fuel cell 100 (the dew point of the fuel gas flowing through the fuel gas channel 8) becomes lower than the temperature of the cooling medium flowing through the cooling medium channel 10.

Moreover, the controller 110 causes the oxidizing gas supply unit 102 to supply the oxidizing gas through the oxidizing gas supply passage 153 to the oxidizing gas inner channel 61B of the fuel cell stack 61. While the oxidizing gas supplied to the oxidizing gas inner channel 61B flows through the oxidizing gas inner channel 61B, it is supplied to the oxidizing gas channel 9 of the fuel cell 100.

While the fuel gas supplied to the fuel gas channel 8 flows through the fuel gas channel 8, it is supplied to the anode electrode 4A. Moreover, while the oxidizing gas supplied to the oxidizing gas channel 9 flows through the oxidizing gas channel 9, it is supplied to the cathode electrode 4B. Then, the hydrogen in the fuel gas supplied to the anode electrode 4A and the oxygen in the oxidizing gas supplied to the cathode electrode 4B electrochemically react with each other to generate water, electricity, and heat. The generated water humidifies the fuel gas and the oxidizing gas. Moreover, the generated electricity is supplied to an external electric power load (for example, domestic electrical apparatus) by an output control unit, not shown.

The fuel gas unconsumed in the anode electrode 4A is discharged as the off fuel gas to the off fuel gas passage 152, and the off fuel gas discharged to the off fuel gas passage 152 is supplied to the burner 101C. Moreover, the oxidizing gas unconsumed in the cathode electrode 4B is discharged as the off oxidizing gas through the off oxidizing gas passage 154 to the outside of the fuel cell system 200. While the off oxidizing gas discharged to the off oxidizing gas passage 154 flows through the off oxidizing gas passage 154, it performs heat exchange and moisture exchange in the total enthalpy heat exchanger 104 with the oxidizing gas supplied to the oxidizing gas inner channel 61B to humidify the oxidizing gas supplied to the oxidizing gas inner channel 61B.

Further, the controller 110 causes the cooling medium supply unit 103 to supply the cooling medium through the cooling medium inner channel 61C of the fuel cell stack 61 to the cooling medium channel 10. The cooling medium supplied to the cooling medium channel 10 recovers the heat generated by the electrochemical reaction between the hydrogen and the oxygen and is then supplied through the cooling medium circulation passage 155 to the cooling medium tank 105. At this time, the controller 110 may control (reduce) the operation amount of the flow rate adjuster of the cooling medium supply unit 103 to reduce the flow velocity of the cooling medium flowing through the cooling medium channel 10 such that each of the dew point of the fuel gas flowing through the fuel gas channel 8 and the dew point of the oxidizing gas flowing through the oxidizing gas channel 9 becomes lower than the temperature of the cooling medium flowing through the cooling medium channel 10. Moreover, the controller 110 may control (increase) the operation amount of the temperature adjuster to increase the temperature of the cooling medium flowing through the cooling medium channel 10 such that each of the dew point of the fuel gas flowing through the fuel gas channel 8 and the dew point of the oxidizing gas flowing through the oxidizing gas channel 9 becomes lower than the temperature of the cooling medium flowing through the cooling medium channel 10.

To be specific, the fuel cell system 200 according to Embodiment 5 is configured such that the controller 110 controls the fuel processor 101 (water supply unit 101B), the oxidizing gas supply unit 102, the cooling medium supply unit 103, and the like so as to realize a low-humidity operating condition (condition in which each of the dew point of the fuel gas flowing through the fuel gas channel 8 and the dew point of the oxidizing gas flowing through the oxidizing gas channel 9 is lower than the temperature of the cooling medium flowing through the cooling medium channel 10).

The fuel cell system 200 according to Embodiment 5 configured as above includes the fuel cell stack 61 (fuel cell 100) according to Embodiment 1. Therefore, even when the controller 110 controls the fuel processor 101, the oxidizing gas supply unit 102, and the cooling medium supply unit 103 so as to operate in the low-humidity condition, the same operational advantages as the fuel cell stack 61 (fuel cell 100) according to Embodiment 1 can be obtained.

In Embodiment 5, the fuel processor is used as a fuel gas supply unit configured to supply the fuel gas to the fuel cell 100. However, the present embodiment is not limited to this. The fuel gas supply unit may be any device as long as it can supply the fuel gas to the fuel cell 100 while adjusting the flow rate and humidification amount of the fuel gas. For example, the fuel gas supply unit may be constituted by a device configured to supply the hydrogen gas of a hydrogen bomb, a hydrogen absorbing alloy, or the like, a humidifier, and a flow rate adjuster.

Moreover, in Embodiment 5, the fuel processor 101 constitutes the first reactant gas supply unit, and the oxidizing gas supply unit 102 constitutes the second reactant gas supply unit. However, the present embodiment is not limited to this. The fuel processor 101 may constitute the second reactant gas supply unit, and the oxidizing gas supply unit 102 may constitute the first reactant gas supply unit.

Further, in Embodiment 5, the fuel cell stack 61 (fuel cell 100) according to Embodiment 1 is included. However, the present embodiment is not limited to this. The fuel cell stack 61 (fuel cell 100) according to any one of Modification Example 1 and Modification Example 2 of Embodiment 1 and Embodiments 2 to 4 may be included.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

In accordance with the polymer electrolyte fuel cell, the fuel cell stack including the polymer electrolyte fuel cell, the fuel cell system, and the method for operating the fuel cell system according to the present invention, when the fuel cell system is operated in the low-humidity condition, the drying of the polymer electrolyte membrane can be suppressed, and therefore, the deterioration of the polymer electrolyte membrane can be suppressed. Thus, the present invention is useful in the field of the fuel cell.

REFERENCE SIGNS LIST 1 polymer electrolyte membrane
2A anode catalyst layer
2B cathode catalyst layer
3A anode gas diffusion layer
3B cathode gas diffusion layer
4A anode electrode
4B cathode electrode
5 MEA (Membrane-Electrode-Assembly)
6A anode separator
6B cathode separator
7 gasket
8 fuel gas channel
8a straight portion (horizontal portion)
8b return portion (vertical portion)
9 oxidizing gas channel
9a straight portion (horizontal portion)
9b return portion (vertical portion)
10 cooling medium channel
11 first rib portion
11A first outer rib portion
12 second rib portion
12A second outer rib portion
31 fuel gas supply manifold hole
32 fuel gas discharge manifold hole
33 oxidizing gas supply manifold hole
34 oxidizing gas discharge manifold hole
35 cooling medium supply manifold hole
36 cooling medium discharge manifold hole
41 first portion
42 second portion
51 first particular portion
52 second particular portion
61 fuel cell stack
62 cell stack body
63 first end plate
64 second end plate
100 fuel cell
61A fuel gas inner channel
61B oxidizing gas inner channel
61C cooling medium inner channel
101 fuel processor
101A material supply unit
101B water supply unit
101C burner
102 oxidizing gas supply unit
103 cooling medium supply unit
104 total enthalpy heat exchanger
105 cooling medium tank
110 controller 131 fuel gas supply manifold
132 fuel gas discharge manifold
133 oxidizing gas supply manifold
134 oxidizing gas discharge manifold
135 cooling medium supply manifold
136 cooling medium discharge manifold
151 fuel gas supply passage
152 off fuel gas passage
153 oxidizing gas supply passage
154 off oxidizing gas passage
155 cooling medium circulation passage
200 fuel cell system
202 electrode
202A portion
202B portion
203 reactant gas channel
204 rib portion

The invention claimed is:

1. A polymer electrolyte fuel cell comprising:
a membrane-electrode assembly including a polymer electrolyte membrane and a pair of electrodes sandwiching a portion of the polymer electrolyte membrane, the portion being located on an inner side of a peripheral portion of the polymer electrolyte membrane;
an electrically-conductive first separator having a plate shape, disposed to contact one of the pair of electrodes of the membrane-electrode assembly, and including a first reactant gas channel formed on one main surface of the first separator and having a bent portion, said one main surface contacting said one of the pair of electrodes; and
an electrically-conductive second separator having a plate shape, disposed to contact the other one of the pair of electrodes of the membrane-electrode assembly, and having a second reactant gas channel formed on one main surface of the second separator and having a bent portion, said one main surface contacting said other one of the pair of electrodes, wherein:
the first reactant gas channel includes a first overlapping portion, a first portion and a first particular portion within a region of said one of the pair of electrodes, when viewed in a thickness direction of the first separator,
the first overlapping portion is a portion where the first reactant gas channel extending from an upstream end thereof first overlaps the second reactant gas channel,
the first portion is located downstream of the first overlapping portion and is a portion where the first reactant gas channel first separates from the second reactant gas channel,
the first particular portion includes the first portion,
a width of the first reactant gas channel in the first particular portion is smaller than a width of the first reactant gas channel in a upstream portion located upstream of the first particular portion of the first reactant gas channel and a width of the first reactant gas channel in a downstream portion located downstream of the first particular portion of the first reactant gas channel.

2. The polymer electrolyte fuel cell according to claim 1, wherein:
a cooling medium channel is formed on at least one of the other main surface of the first separator and the other main surface of the second separator.

3. The polymer electrolyte fuel cell according to claim 1, wherein the first particular portion consists of the first portion and a portion of the first reactant gas channel located upstream of the first portion.

4. The polymer electrolyte fuel cell according to claim 1, wherein the first particular portion consists of the first portion and a portion of the first reactant gas channel located downstream of the first portion.

5. The polymer electrolyte fuel cell according to claim 1, wherein the first particular portion is constituted by a portion extending from the first portion and having a length corresponding to a sum of a width of the second reactant gas channel and a width of a second rib portion formed between adjacent portions of the second reactant gas channel.

6. The polymer electrolyte fuel cell according to claim 1, wherein the first particular portion is constituted by a portion extending from the first portion and having a length corresponding to a width of the second reactant gas channel.

7. The polymer electrolyte fuel cell according to claim 1, wherein:
the second reactant gas channel is one of a plurality of second reactant gas channels formed on said one main surface of the second separator, and
the first particular portion is constituted by a portion extending from the first portion and having a length corresponding to a sum of a sum of widths of the plurality of second reactant gas channels and a sum of widths of a plurality of second rib portions formed among the plurality of second reactant gas channels.

8. The polymer electrolyte fuel cell according to claim 1, wherein:
the second reactant gas channel is one of a plurality of second reactant gas channels formed on said one main surface of the second separator, and
the first particular portion is constituted by a portion extending from the first portion and having a length corresponding to a sum of widths of the plurality of second reactant gas channels.

9. The polymer electrolyte fuel cell according to claim 1, wherein:
the second reactant gas channel includes a second overlapping portion, a second portion and a second particular portion within a region of said one of the pair of electrodes, when viewed in the thickness direction of the first separator,
the second overlapping portion is a portion where the second reactant gas channel extending from an upstream end thereof first overlaps the first reactant gas channel,
the second portion is located downstream of the second overlapping portion and is a portion where the second reactant gas channel first separates from the first reactant gas channel,
the second particular portion includes the second portion,
a width of the second reactant gas channel in the second particular portion is smaller than a width of the second reactant gas channel in a upstream portion located upstream of the second particular portion of the second reactant gas channel and a width of the second reactant gas channel in a downstream portion located downstream of the second particular portion of the second reactant gas channel.

10. The polymer electrolyte fuel cell according to claim 8, wherein the second particular portion consists of the second portion and a portion of the second reactant gas channel located upstream of the second portion.

11. The polymer electrolyte fuel cell according to claim 8, wherein the second particular portion consists of the second portion and a portion of the second reactant gas channel located downstream of the second portion.

12. The polymer electrolyte fuel cell according to claim 8, wherein the second particular portion is constituted by a portion extending from the second portion and having a length corresponding to a sum of a width of the first reactant gas channel and a width of a first rib portion formed between adjacent portions of the first reactant gas channel.

13. The polymer electrolyte fuel cell according to claim 8, wherein the second particular portion is constituted by a portion extending from the second portion and having a length corresponding to a width of the first reactant gas channel.

14. The polymer electrolyte fuel cell according to claim 8, wherein:
the first reactant gas channel is one of a plurality of first reactant gas channels formed on said one main surface of the first separator, and
the second particular portion is constituted by a portion extending from the second portion and having a length corresponding to a sum of a sum of widths of the plurality of first reactant gas channels and a sum of widths of a plurality of first rib portions formed among the plurality of first reactant gas channels.

15. The polymer electrolyte fuel cell according to claim 8, wherein:
the first reactant gas channel is one of a plurality of first reactant gas channels formed on said one main surface of the first separator, and
the second particular portion is constituted by a portion extending from the second portion and having a length corresponding to a sum of widths of the plurality of first reactant gas channels.

16. The polymer electrolyte fuel cell according to claim 1, wherein at least one of the first reactant gas channel and the second reactant gas channel are each formed in a serpentine shape.

17. The polymer electrolyte fuel cell according to claim 1, wherein at least one of the first reactant gas channel and the second reactant gas channel are each formed in a spiral shape.

18. The polymer electrolyte fuel cell according to claim 1, wherein the first reactant gas channel and the second reactant gas channel are formed so as to realize parallel flow.

19. A fuel cell stack configured by stacking and fastening a plurality of the polymer electrolyte fuel cells according to claim 1.

20. A fuel cell system comprising:
the polymer electrolyte fuel cell according to claim 2;
a first reactant gas supply unit configured to supply the first reactant gas to the first reactant gas channel;
a second reactant gas supply unit configured to supply the second reactant gas to the second reactant gas channel;
a cooling medium supply unit configured to supply the cooling medium to the cooling medium channel; and
a controller configured to control the first reactant gas supply unit, the second reactant gas supply unit, and the cooling medium supply unit such that each of a dew point of the first reactant gas flowing through the first reactant gas channel and a dew point of the second reactant gas flowing through the second reactant gas channel becomes lower than a temperature of the cooling medium flowing through the cooling medium channel.

21. A method for operating a fuel cell system including the polymer electrolyte fuel cell according to claim 2,
the method comprising steps of:
supplying a first reactant gas to the first reactant gas channel by a first reactant gas supply units;
supplying a second reactant gas to the second reactant gas channel by a second reactant gas supply unit; and
supplying a cooling medium to the cooling medium channel by a cooling medium supply unit such that each of a dew point of the first reactant gas flowing through the first reactant gas channel and a dew point of the second reactant gas flowing through the second reactant gas channel becomes lower than a temperature of the cooling medium flowing through the cooling medium channel.

22. The polymer electrolyte fuel cell according to claim 1, wherein the first particular portion includes the first portion and at least one of a portion of the first reactant gas channel located upstream of the first portion and a portion of the first reactant gas channel located downstream of the first portion.

23. The polymer electrolyte fuel cell according to claim 8, wherein the second particular portion includes the second portion and at least one of a portion of the second reactant gas channel located upstream of the second portion and a portion of the second reactant gas channel located downstream of the second portion.

* * * * *